US011966716B2

(12) United States Patent
Mertig et al.

(10) Patent No.: US 11,966,716 B2
(45) Date of Patent: Apr. 23, 2024

(54) APPARATUS AND METHOD FOR FULLY PARALLELIZED SIMULATED ANNEALING USING A SELF-ACTION PARAMETER

(71) Applicants: Hitachi, Ltd., Tokyo (JP); NATIONAL UNIVERSITY CORPORATION HOKKAIDO UNIVERSITY, Hokkaido (JP)

(72) Inventors: Normann Mertig, Tokyo (JP); Takashi Takemoto, Tokyo (JP); Shinya Takamaeda, Sapporo (JP); Kasho Yamamoto, Sapporo (JP); Masato Motomura, Sapporo (JP); Akira Sakai, Sapporo (JP); Hiroshi Teramoto, Sapporo (JP)

(73) Assignees: HITACHI, LTD, Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 896 days.

(21) Appl. No.: 17/005,900

(22) Filed: Aug. 28, 2020

(65) Prior Publication Data
US 2021/0072959 A1 Mar. 11, 2021

(30) Foreign Application Priority Data
Sep. 6, 2019 (JP) .................................. 2019-162856

(51) Int. Cl.
*G06F 7/58* (2006.01)
*G06F 17/11* (2006.01)
(52) U.S. Cl.
CPC .............. *G06F 7/588* (2013.01); *G06F 17/11* (2013.01)

(58) Field of Classification Search
CPC ............ G06F 7/588; G06F 17/11; G06N 7/01; G06N 10/00; G06N 10/60; G06N 10/80
See application file for complete search history.

(56) References Cited

U.S. PATENT DOCUMENTS

2017/0068632 A1  3/2017  Yoshimura et al.
2017/0185380 A1* 6/2017  Hayashi ................ H10B 10/00
(Continued)

FOREIGN PATENT DOCUMENTS

JP        2019-87273 A      4/2018
JP        2019-16077 A      1/2019
(Continued)

OTHER PUBLICATIONS

Paolo Dai Pra et al., "Sampling from a Gibbs Measure with Pair Interaction by Means of PCA", J Stat Phys, 2012, 149, p. 722-737.
(Continued)

*Primary Examiner* — Jyoti Mehta
*Assistant Examiner* — Vivian Diem Ha Ledynh
(74) *Attorney, Agent, or Firm* — MATTINGLY & MALUR, PC

(57) ABSTRACT

An information processing apparatus includes an annealing control unit, a spin interaction memory, a random number generation unit, and a spin state update unit and obtains a solution by using an Ising model. The annealing control unit controls an annealing step and a parameter of a temperature and a parameter of a self-action. The spin interaction memory stores the interaction coefficient of a spin. The random number generation unit generates a predetermined random number. The spin state update unit includes a spin buffer that stores values of a plurality of spins, an instantaneous magnetic field calculation unit that calculates instantaneous magnetic fields of the plurality of spins, a probability calculation unit that calculates update probabilities of the
(Continued)

plurality of spins, and a spin state determination unit that updates the values of the spins based on the update probabilities and a random number.

15 Claims, 38 Drawing Sheets

(56) References Cited

U.S. PATENT DOCUMENTS

| | | |
|---|---|---|
| 2017/0351949 A1 | 12/2017 | Matsubara et al. |
| 2018/0107172 A1* | 4/2018 | Takatsu .............. G05D 23/1917 |
| 2019/0012409 A1 | 1/2019 | Matsubara et al. |
| 2019/0012410 A1 | 1/2019 | Matsubara et al. |
| 2019/0235033 A1* | 8/2019 | Ohzeki ................... G16Z 99/00 |

FOREIGN PATENT DOCUMENTS

| | | |
|---|---|---|
| JP | 2019-16129 A | 1/2019 |
| JP | 2019-71113 A | 5/2019 |
| WO | 2015/132883 A1 | 9/2015 |

OTHER PUBLICATIONS

Sanroku Tsukamoto et al., "An Accelerator Architecture for Combinatorial Optimization Problems", Fujitsu Sci. Tech. J., vol. 53, No. 5, Sep. 2017, p. 8-13.

* cited by examiner $$H(\sigma_i) = -\sum_{(i,j) \in E} \sigma_i J_{ij} \sigma_j - \sum_{i \in V} h_i \sigma_i$$

FIG. 9C

| INSTANTANEOUS MAGNETIC FIELD REGISTER 822 | $+2J_{1,1}\sigma_1$ | $+2J_{1,2}\sigma_2$ | ... | $+2J_{1,N}\sigma_N$ | | |
|---|---|---|---|---|---|---|
| SELF-ACTION | | | | | $qT$ | |
| RANDOM NUMBER | | | | | $rand$ | |
| INVERSION FLAG | | | | | | $F_1$ |
| SPIN STATE UPDATE | | | | | | $\sim\sigma_1$ |

FIG. 10B

4 SPIN SYSTEM

|  | CYCLE 1 | CYCLE 2 | CYCLE 3 | CYCLE 4 |  |
|---|---|---|---|---|---|
| INVERSION FLAG F | 1011 | 0011 | 0001 | 0000 |  |
| SPIN STATE |  | $\sigma_4$ | $\sigma_2$ | $\sigma_1$ |  |
| ADDRESS |  | 11 | 01 | 00 |  |
| STEP END FLAG |  |  |  |  | 1 |

FIG. 11A

PROBABILITY OF STATE INVERSION OF SPIN i $$p_i = \text{sigmoid}\left(-\frac{x_i}{T}\right) \qquad x_i := \sigma_i \bar{h}_i + qT \qquad \text{if: } p_i > rand'' \in (0,1) \Rightarrow \sigma_i \leftarrow -\sigma_i$$

STATE INVERSION PROBABILITY OF SPIN i (PIECEWISE LINEAR APPROXIMATION)

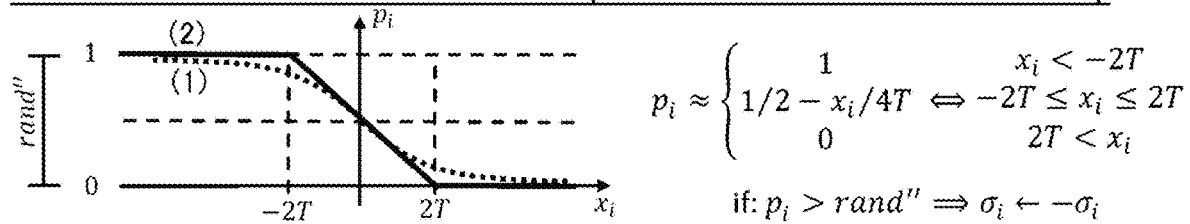

$$p_i \approx \begin{cases} 1 & x_i < -2T \\ 1/2 - x_i/4T & \Leftrightarrow -2T \leq x_i \leq 2T \\ 0 & 2T < x_i \end{cases}$$

if: $p_i > rand'' \Rightarrow \sigma_i \leftarrow -\sigma_i$

SCALING CONVERSION $rand' = (rand'' - 1/2) \times 4T$   $\eta_i = (p_i - 1/2) \times 4T$ $$\eta_i \approx \begin{cases} 2T & x_i < -2T \\ -x_i & \Longleftrightarrow -2T \leq x_i \leq 2T \\ -2T & 2T < x_i \end{cases}$$

if: $\eta_i > rand' \Longrightarrow \sigma_i \leftarrow -\sigma_i$

SIGN CONVERSION $rand = -rand'$    $\xi_i = -\eta_i$ $$\xi_i \approx \begin{cases} -2T & x_i < -2T \\ x_i & \Leftrightarrow -2T \leq x_i \leq 2T \\ 2T & 2T < x_i \end{cases}$$

if: $\xi_i < rand \Rightarrow \sigma_i \leftarrow -\sigma_i$

FIG. 17B
INTERACTION COEFFICIENT DISTRIBUTION FOR EACH CHIP

| INTERACTION COEFFICIENT MATRIX | CHIP 0 | CHIP 1 | CHIP 2 | CHIP 3 |
|---|---|---|---|---|
| | $J_{1,1} \cdots J_{\frac{N}{4},1}$ | $J_{\frac{N}{4}+1,1} \cdots J_{2\frac{N}{4},1}$ | $\cdots$ | $J_{3\frac{N}{4}+1,1} \cdots J_{N,1}$ |
| | $J_{1,2} \cdots J_{\frac{N}{4},2}$ | $J_{\frac{N}{4}+1,2} \cdots J_{2\frac{N}{4},2}$ | $\vdots$ | $J_{3\frac{N}{4}+1,2} \cdots J_{N,2}$ |
| | $\vdots$ | $\vdots$ | | $\vdots$ |
| | $J_{1,\frac{N}{4}} \cdots J_{\frac{N}{4},\frac{N}{4}}$ | $J_{\frac{N}{4}+1,\frac{N}{4}} \cdots J_{2\frac{N}{4},\frac{N}{4}}$ | $\cdots$ | $J_{3\frac{N}{4}+1,\frac{N}{4}} \cdots J_{N,\frac{N}{4}}$ |
| | $\bullet\bullet\bullet$ | $\bullet\bullet\bullet$ | $\bullet\bullet\bullet$ | $\bullet\bullet\bullet$ |
| | $\bullet\bullet\bullet$ | $\bullet\bullet\bullet$ | $\bullet\bullet\bullet$ | $\bullet\bullet\bullet$ |
| | $J_{1,3\frac{N}{4}+1} \cdots J_{\frac{N}{4},3\frac{N}{4}+1}$ | $J_{\frac{N}{4}+1,3\frac{N}{4}+1} \cdots J_{2\frac{N}{4},3\frac{N}{4}+1}$ | $\cdots$ | $J_{3\frac{N}{4}+1,3\frac{N}{4}+1} \cdots J_{N,3\frac{N}{4}+1}$ |
| | $\vdots$ | $\vdots$ | $\vdots$ | $\vdots$ |
| | $J_{1,N} \cdots J_{\frac{N}{4},N}$ | $J_{\frac{N}{4}+1,N} \cdots J_{2\frac{N}{4},N}$ | $\cdots$ | $J_{3\frac{N}{4}+1,N} \cdots J_{N,N}$ |

FIG. 17C
PROCEDURE OF TRANSMISSION DATA AND DIFFERENCE CALCULATION

|  | CHIP 0 | CHIP 1 | CHIP 2 | CHIP 3 |
|---|---|---|---|---|
| step1 | CHANGED SPIN 0 | CHANGED SPIN 1 | CHANGED SPIN 2 | CHANGED SPIN 3 |
| step2 | CHANGED SPIN 3 | CHANGED SPIN 0 | CHANGED SPIN 1 | CHANGED SPIN 2 |
| step3 | CHANGED SPIN 2 | CHANGED SPIN 3 | CHANGED SPIN 0 | CHANGED SPIN 1 |
| step4 | CHANGED SPIN 1 | CHANGED SPIN 2 | CHANGED SPIN 3 | CHANGED SPIN 0 |

FIG. 19A

| GROUP | 1 | | | 2 | | | ... | M | | |
|---|---|---|---|---|---|---|---|---|---|---|
| $i$ | 1 | 2 | ... | $\frac{N}{M}$ | $\frac{N}{M}+1$ | ... | $2\frac{N}{M}$ | $(M-1)\frac{N}{M}+1$ | ... | N |
| $\sigma_i$ | 1 | -1 | ... | 1 | -1 | ... | -1 | 1 | ... | 1 |
| $\sigma'_m$ | 1 | | | -1 | | | | 1 | | |

APPARATUS AND METHOD FOR FULLY PARALLELIZED SIMULATED ANNEALING USING A SELF-ACTION PARAMETER

CROSS-REFERENCE TO RELATED APPLICATION

The present application claims priority from Japanese application JP 2019-162856, filed on Sep. 6, 2019, the contents of which is hereby incorporated by reference into this application.

BACKGROUND OF THE INVENTION

1. Field of the Invention

The present invention relates to an information processing technique, particularly to a technique that employs annealing as an algorithm for searching for an optimal solution.

2. Description of Related Art

Annealing is known as a general-purpose algorithm for searching for an optimal solution. An annealing machine is a device dedicated to executing annealing and outputting an approximate optimal solution (for example, see International Publication WO2015-132883, JP-A-2019-16077, JP-A-2019-16129, JP-A-2019-71113, JP-A-2019-87273, and "An accelerator architecture for combinatorial optimization problems", Sanroku Tsukamoto et. Al., Fujitsu Sci. Tech. J., Vol. 53, No. 5 (September 2017)). The annealing machine uses an Ising model as a calculation model that can accept problems in general. The annealing machine has the parameters of the Ising model as inputs. Therefore, a user of the annealing machine needs to convert the problem to be solved into the Ising model.

FIG. 1A illustrates a conceptual diagram of an energy landscape of the Ising model. The abscissa plots a spin state (spin arrangement), and the ordinate plots an energy function in the spin arrangement. The Ising model is composed of a given spin arrangement, an interaction coefficient, and an external magnetic field coefficient. An energy function $H(\sigma_i)$ (generally called Hamiltonian) of the Ising model is as illustrated in FIG. 1A. $\sigma_i$ and $\sigma_j$ are values of the i-th and j-th spins, respectively, and usually take two values, upward or downward. $J_{ij}$ is an interaction coefficient between the i-th and j-th spins, and $h_i$ is an external magnetic field coefficient for the i-th spin. E and V indicate constraints.

In the stochastic transition, the spin state stochastically repeats a transition to a state σ' near a current state σ. The probability of the transition from the state σ to the state σ' is referred to as transition probability $P(\sigma, \sigma')$. Metropolis and Gibbs methods are known as transition probabilities (see JP-A-2019-16077, JP-A-2019-16129, and JP-A-2019-87273). The transition probability is adjusted by a parameter generally called temperature T.

As a method for generating the neighboring state σ', it is general to update the value of one spin from the current state σ. By changing the spins to be updated one by one in order, the entire spins are searched. When the transition is executed while the temperature T is gradually decreased from a large value, the energy asymptotically converges to a state with the lowest energy (ground state) via a local solution. The method for finding an optimal solution or an approximate solution of the minimization problem by this manner is known as a simulated annealing method (SA method).

FIG. 1B illustrates the concept of spin updates in the Ising model. When modeling a problem as an Ising model, there is a distinction between a sparse graph and a complete graph. The sparse graph illustrated on the left side of the drawing is a model in which one node (spin) is connected to only some of the limited nodes. The arrow pointing upward or downward in the drawing indicates the direction of a spin. In the sparse graph, multiple spins can be updated simultaneously (parallel update). However, in the sparse graph, it is difficult to improve processing performance because the number of nodes to be connected is limited.

On the other hand, the complete graph illustrated on the right side of the drawing is a model in which one node is connected to all other nodes. In the complete graph, nodes interact with each other (indicated by the letter j and suffix in the drawing), and therefore multiple spins cannot be updated simultaneously. Therefore, in the SA method, for example, a method in which a node is divided into two and updated one by one is adopted (middle row on the right side of the drawing, "single update (non-parallel)"). However, since this method requires a long processing time, as illustrated by the equation in FIG. 1B, a spin update is not parallel, but a method for speeding up by updating an instantaneous magnetic field (also called mean field, cavity field, local field, and the like) in parallel has been proposed (see JP-A-2019-16077, JP-A-2019-16129, JP-A-2019-71113, JP-A-2019-87273, and "An accelerator architecture for combinatorial optimization problems", Sanroku Tsukamoto et. Al., Fujitsu Sci. Tech. J., Vol. 53, No. 5 (September 2017). The instantaneous magnetic field indicated by $h_i$ and an overline in the drawing is indicated by $Ih_i$ in the specification and the like.

FIG. 2 illustrates a conventional procedure for obtaining an optimal solution, which the inventors have examined and arranged JP-A-2019-16077, JP-A-2019-16129, JP-A-2019-71113, and JP-A-2019-87273, and "An accelerator architecture for combinatorial optimization problems", Sanroku Tsukamoto et. Al., Fujitsu Sci. Tech. J., Vol. 53, No. 5 (September 2017). It is assumed that the optimization problem has already been modeled in the form of a complete graph.

The processing S201 is data initialization. An initial annealing step and a maximum step (t_max) are set, and how many times the spin update is repeated is set. An inverse temperature $\beta(=1/T)$ is set to an initial value $\beta_0$. An initial state is randomly set for each of N spins (nodes) Q included in the model. The value of a spin may be binary, but here, +1 and −1. The external magnetic field coefficient $h_i$ is determined for each node, and an interaction coefficient $j_{ij}$ between the nodes is determined. The instantaneous magnetic field $Ih_i = h_i + \Sigma_{j=1 \sim N} \sigma_j j_{ij}$ is obtained. An inversion flag F indicating the inversion of a spin and an inversion index j specifying the inverted spin are set to an initial value 0. These data are determined based on the model and set in the annealing machine. Specific structures of the annealing machine are described in International Publication WO 2015-132883, JP-A-2019-16077, JP-A-2019-16129, JP-A-2019-71113, JP-A-2019-87273, and "An accelerator architecture for combinatorial optimization problems", Sanroku Tsukamoto et. Al., Fujitsu Sci. Tech. J., Vol. 53, No. 5 (September 2017). Next, the processing S202 to S204 illustrate a flow of a spin update.

In the processing S202, the instantaneous magnetic field $Ih_1$ is updated. If the inversion flag F is 1, the instantaneous magnetic field $Ih_i$ is calculated and updated in parallel for each spin. In this method, the spins are updated one by one, and only the change in the spins needs to be reflected in the instantaneous magnetic field, and therefore $Ih_i \leftarrow Ih_i + 2\sigma_j j_{ji}$.

In the processing S203, an update probability $p_i$ of each spin is calculated and updated in parallel.

$$p_i \leftarrow \text{sigmoid}(-2\sigma_i Ih_i \beta)$$

sigmoid is a sigmoid function.

In the processing S204, whether or not each spin can be updated is determined based on the update probability $p_i$ of the spin. If there are updatable spins, one $\sigma_j$ is randomly selected from the updatable spins, the spin is updated ($\sigma_j \leftarrow -\sigma_j$), and the inversion flag is changed ($F \leftarrow 1$).

In processing S205, the annealing step is advanced by one ($t \leftarrow t+1$). Further, the inverse temperature is updated ($\beta = \beta(t)$). In annealing, the inverse temperature, which is the reciprocal of the temperature, gradually increases.

The processing S202 to S205 are repeated until an annealing step t reaches t_max in the determination processing S206. When the annealing step t reaches t_max, the spin arrangement is read out and output as a (pseudo) optimized spin arrangement (S207).

In the above method, the update of the instantaneous magnetic field and the calculation of the update probability of the spin can be performed in parallel, and the speed can be increased. However, a spin update is not performed in parallel, but is performed sequentially for each spin.

Then, the method for updating spins in the annealing machine in parallel was examined.

SUMMARY OF THE INVENTION

A preferred aspect of the present invention is an information processing apparatus including an annealing control unit, a spin interaction memory, a random number generation unit, and a spin state update unit and obtaining a solution by using an Ising model. The annealing control unit controls an annealing step and a parameter of a temperature and a parameter of a self-action. The spin interaction memory stores the interaction coefficient of spins. The random number generation unit generates predetermined random numbers. The spin state update unit includes a spin buffer that stores values of a plurality of spins, an instantaneous magnetic field calculation unit that calculates instantaneous magnetic fields of the plurality of spins, a probability calculation unit that calculates update probabilities of the plurality of spins, and a spin state determination unit that updates the values of the spins based on the update probabilities and random numbers.

Another preferred aspect of the present invention is an information processing method for obtaining a solution by using an Ising model by an information processing apparatus including an annealing control unit, a spin interaction memory, a random number generation unit, and a spin state update unit. The annealing control unit controls an annealing step and updates the parameter of the temperature parameter and the parameter of the self-action. The spin interaction memory stores the interaction coefficient of the spins. The random number generation unit generates predetermined random numbers. The spin state update unit calculates instantaneous magnetic fields of a plurality of spins in parallel by using an interaction coefficient for each annealing step, calculates update probabilities of the plurality of spins in parallel by using the instantaneous magnetic fields, and updates the values of the plurality of spins in parallel by using the update probabilities and random numbers, and the interaction coefficient used for calculating the instantaneous magnetic fields is an interaction coefficient related to the spins updated in the immediately preceding annealing step.

Spin updates can be performed in parallel in the annealing machine.

BRIEF DESCRIPTION OF THE DRAWINGS

FIG. 9C is a time chart of updating a spin state;

FIG. 10B is a time chart illustrating a function of the inverted spin selection circuit;

FIG. 11A is an explanatory diagram for linearly approximating a spin inversion probability p by a sigmoid function;

FIG. 17B is a conceptual diagram illustrating a matrix of interaction coefficients stored in a spin interaction memory of the annealer chip;

FIG. 17C is a conceptual diagram illustrating a sharing sequence of changing spin information between multi-annealer chips;

FIG. 19A is an explanatory diagram illustrating concept of a macro-spin.

DESCRIPTION OF EMBODIMENTS

Figure 1A:
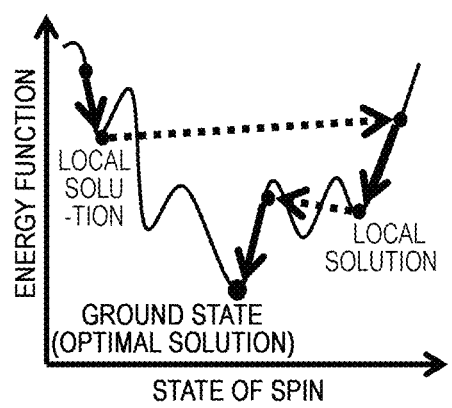
FIG. 1A is a conceptual diagram illustrating a principle of an annealing machine.
Figure 1B:
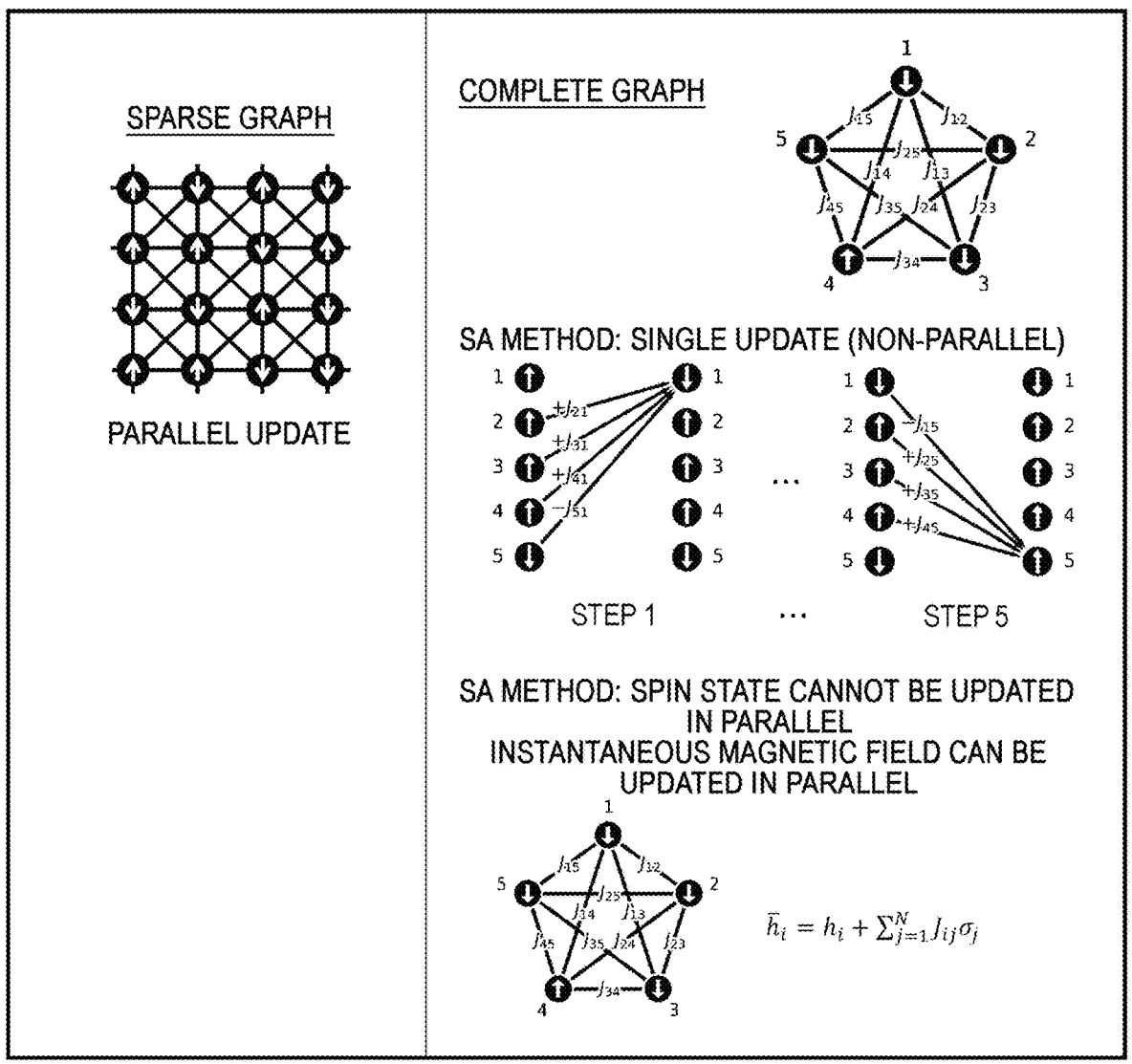
FIG. 1B is a conceptual diagram illustrating a spin updating method.

Embodiments will be described in detail with reference to drawings. However, the present invention is not construed as being limited to the description of the embodiments below. It is easily understood by those skilled in the art that the specific configuration can be changed without departing from the idea or spirit of the present invention.

In the structures of the invention described below, the same portions or portions having similar functions are denoted by the same reference numerals in different drawings, and description thereof is not repeated in some cases.

When there are a plurality of elements having the same or similar functions, the same reference numerals may be given different subscripts for description. However, when there is no need to distinguish the plurality of elements, the description may be omitted with suffixes omitted.

Notations such as "first", "second", and "third" in this specification and the like are used to identify constituent elements, and do not necessarily limit the number, order, or content thereof. In addition, numbers for identifying constituent elements are used for each context, and numbers used in one context do not necessarily indicate the same configuration in another context. Further, this does not prevent a constituent element identified by a certain number from also having a function of a constituent element identified by another number.

The position, size, shape, range, or the like of each configuration illustrated in the drawings and the like are not accurately represented in some cases in order to facilitate understanding of the present invention. For this reason, the present invention is not necessarily limited to the position, size, shape, range, and the like disclosed in the drawings and the like.

Publications, patents, and patent applications cited herein form a part of the description of the present specification as they are.

Constituent elements described in the singular herein include the plural unless specifically stated otherwise.

Figure 3:
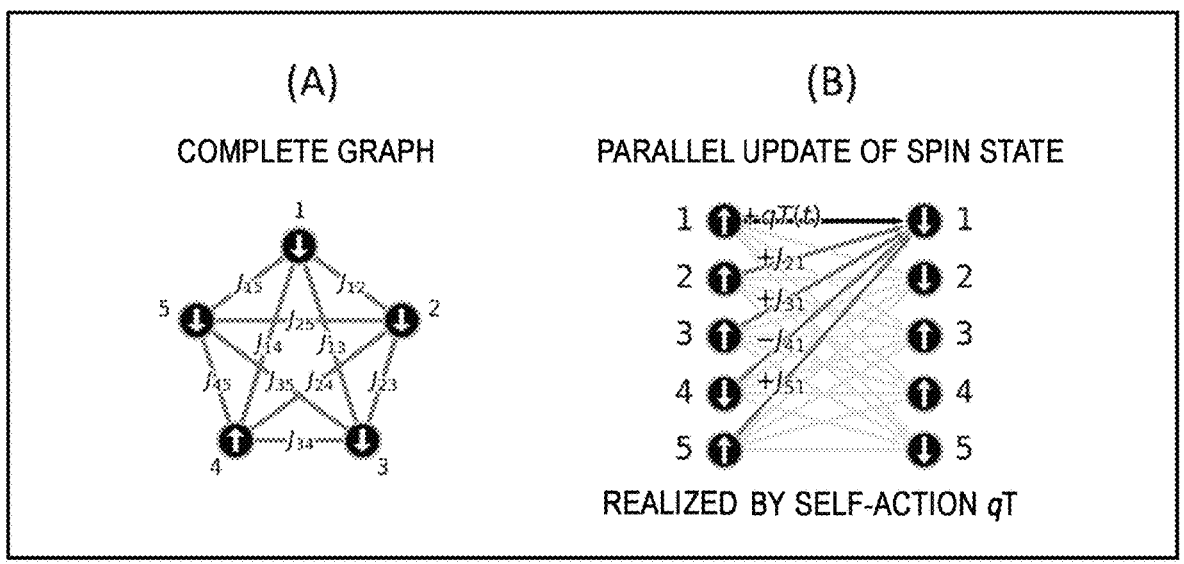
FIG. 3 is a conceptual diagram illustrating a principle of spin updating of the annealing machine according to an example.

FIG. 3 is a conceptual diagram illustrating the principle of the example described below. In the following example, the optimization problem is modeled in the form of a complete graph as illustrated in FIG. 3A. Then, as illustrated in FIG. 3B, the spin states are updated in parallel by replacing each spin with a pair of copies. In order to update the spins in parallel, the present example introduces a self-action $qT(t)$ as a new parameter.

Example 1

Figure 4:
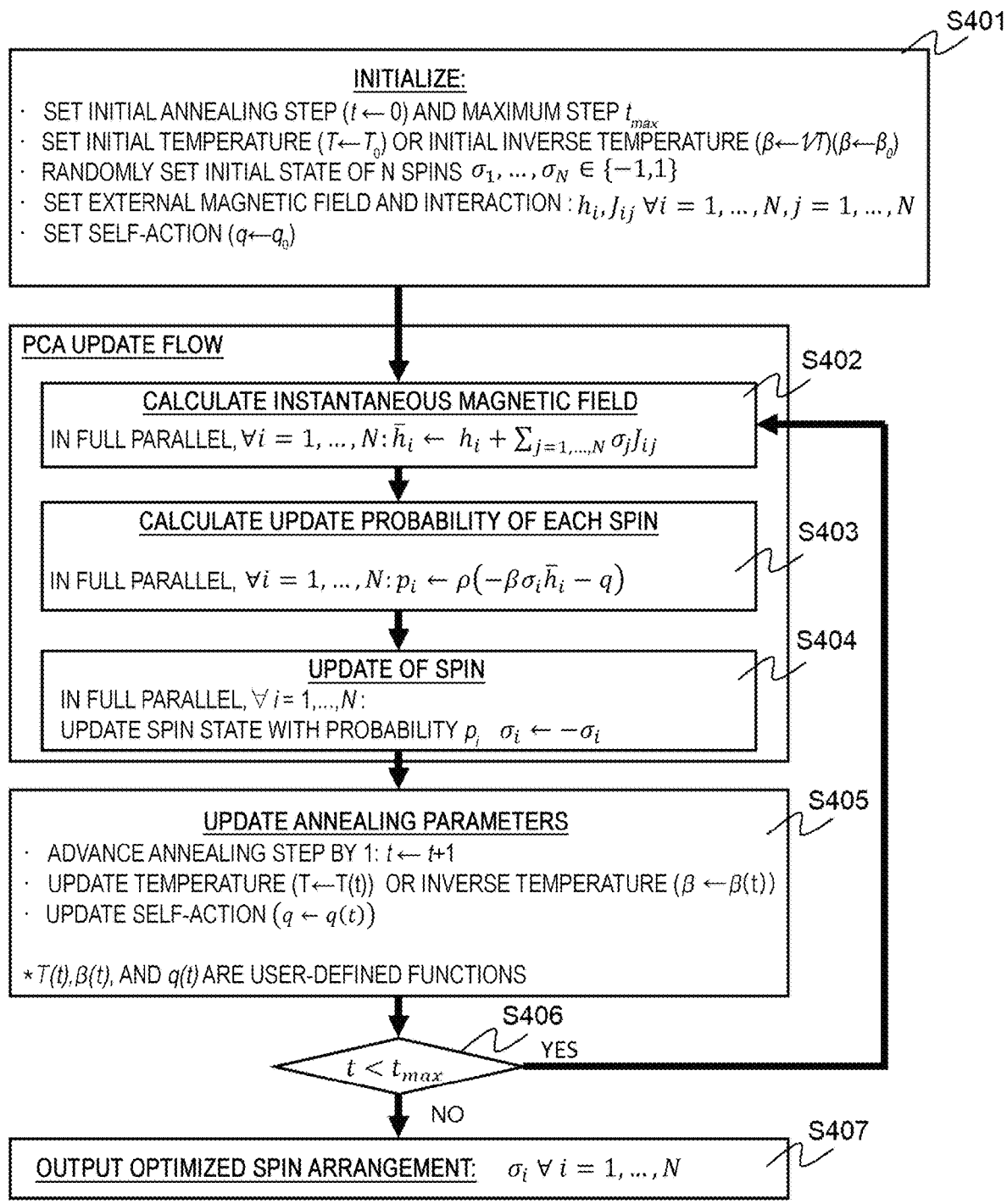
FIG. 4 is a flowchart illustrating processing performed by an annealing machine according to Example 1.

FIG. 4 is a flowchart illustrating processing in which the annealing machine according to Example 1 updates spins in parallel. It is assumed that the optimization problem has already been modeled in the form of a complete graph.

The processing S401 is data initialization. The initial annealing step t is set to 0. The maximum step (t_max) is set, and how many times the spin update is repeated is set. The temperature T or the inverse temperature $\beta(=1/T)$ is set to an initial value $T_0$ or $\beta_0$. An initial state is randomly set for each of N spins (nodes) σ included in the model. The value of a spin may be binary, but here, +1 and −1. The external magnetic field coefficient $h_i$ is determined for each node, and an interaction coefficient $j_{ij}$ between the nodes is determined. In the present example, a self-action q is introduced as a parameter, and the self-action is set to an initial value $q \leftarrow q0$. These data are determined based on the model and set in the annealing machine. Specific structures of the annealing machine are described in International Publication WO 2015-132883, JP-A-2019-16077, JP-A-2019-16129, JP-A-2019-71113, JP-A-2019-87273, and "An accelerator architecture for combinatorial optimization problems", Sanroku Tsukamoto et. Al., Fujitsu Sci. Tech. J., Vol. 53, No. 5 (September 2017). Next, the processing S402 to S404 illustrate a flow of a spin update.

In the processing S402, an instantaneous magnetic field is calculated. The instantaneous magnetic field $Ih_i$ is calculated in parallel for each spin. In this method, since the spins are updated in parallel, the changes of all the spins are reflected, and $Ih_i \leftarrow h_i + \Sigma_{j=1 \sim N} \sigma_j j_{ij}$.

In the processing S403, the update probability $p_1$ of each spin is calculated and updated in parallel.

$$p_i \leftarrow \rho(-\beta \sigma_i Ih_{i-q})$$

Here, ρ generally uses a sigmoid function, but other functions are also possible.

In the processing S404, whether or not each spin can be updated is determined based on the spin update probability pi, and the spins are updated in parallel ($\sigma_1 \leftarrow -\sigma_i$).

In the processing S405, the annealing step is advanced by one ($t \leftarrow t+1$). Further, the temperature T or the inverse temperature β is updated (($T \leftarrow T(t)$) or ($\beta \leftarrow \beta(t)$)). Further, the self-action q is updated ($q \leftarrow q(t)$). Here, $T(t)$, $\beta(t)$, and $q(t)$ are functions defined by the user.

The user can arbitrarily select $T(t)$, $\beta(t)$, and $q(t)$. In general, the temperature T gradually decreases as the annealing step proceeds, and the reciprocal inverse temperature β gradually increases. In addition, $q(t)$ may set in principle so that the i-th spin of the left spin group and the i-th spin of the right spin group illustrated in FIG. 3B have the same value in the ground state. That is, in the final step of annealing, a function that makes $q(t)$ sufficiently large is selected. Generally, in the final step of annealing, $q(t)$ takes a maximum value.

The processing S402 to S405 are repeated until the annealing step t reaches t_max in the determination processing S406. When the annealing step t reaches t_max, a spin arrangement $\sigma_i$ is read and output as a (pseudo) optimized spin arrangement (S407).

The principle of the processing S402 to S404 related to the spin update is an application of an algorithm called probabilistic cellular automaton (PCA) (see "Sampling from a Gibbs Measure with Pair Interaction by Means of PCA", Paolo Dai Pra et. Al., J Stat Phys (2012) 149:722-737 DOI 10.1007/s10955-012-0612-9). "Sampling from a Gibbs Measure with Pair Interaction by Means of PCA", Paolo Dai Pra et. Al., J Stat Phys (2012) 149:722-737 DOI 10.1007/s10955-012-0612-9 introduces the self-action q as a parameter, and the parameter q controls the average number of spin inversions in one update step. However, "Sampling from a Gibbs Measure with Pair Interaction by Means of PCA", Paolo Dai Pra et. Al., J Stat Phys (2012) 149:722-737 DOI 10.1007/s10955-012-0612-9 is a research paper on Gibbs Measure and does not relate to an optimization problem or annealing.

In the Ising model, two coupled spins cannot usually be updated simultaneously. This is because errors occur in the estimated values of the energy changes. Therefore, when the complete graph illustrated in FIG. 3A is used, simultaneous (parallel) spin updates cannot be performed. As illustrated in FIG. 3B, PCA can be interpreted as introducing a copy for each spin to form a paired spin arrangement. One of the spins on the right in FIG. 3B is connected to all of the spins on the left. One of the spins on the left is connected to all of the spins on the right. On the other hand, the spins on the right are not connected to each other. Also, the spins on the left are not connected to each other. Thus, the spins on the right can be updated simultaneously. Also, the spins on the left can be updated simultaneously.

However, the spin arrangement on the right side and the spin arrangement on the left side in FIG. 3B can have different optimal spin arrangements, and therefore the corresponding left and right spins are usually different as illustrated in FIG. 3B. For this reason, by introducing the parameter q and making q sufficiently large, control is performed so that the spin arrangement on the right side and the spin arrangement on the left side become the same. When this condition is satisfied, the complete graph illustrated in FIG. 3A can be replaced with the paired spin arrangement illustrated in FIG. 3B, and parallel updates can be performed by using the paired spin arrangement in FIG. 3B.

Example 1 has illustrated a basic concept. In this method, the calculation of the instantaneous magnetic field, the calculation of the update probability of the spin, and the update of the spin can all be executed in parallel. However, the calculation of the instantaneous magnetic field needs to reflect the state of all nodes. When using a sigmoid function, it is necessary to calculate the function. In Example 2, a specific implementation that further considers computation efficiency will be described.

Example 2

Figure 5:
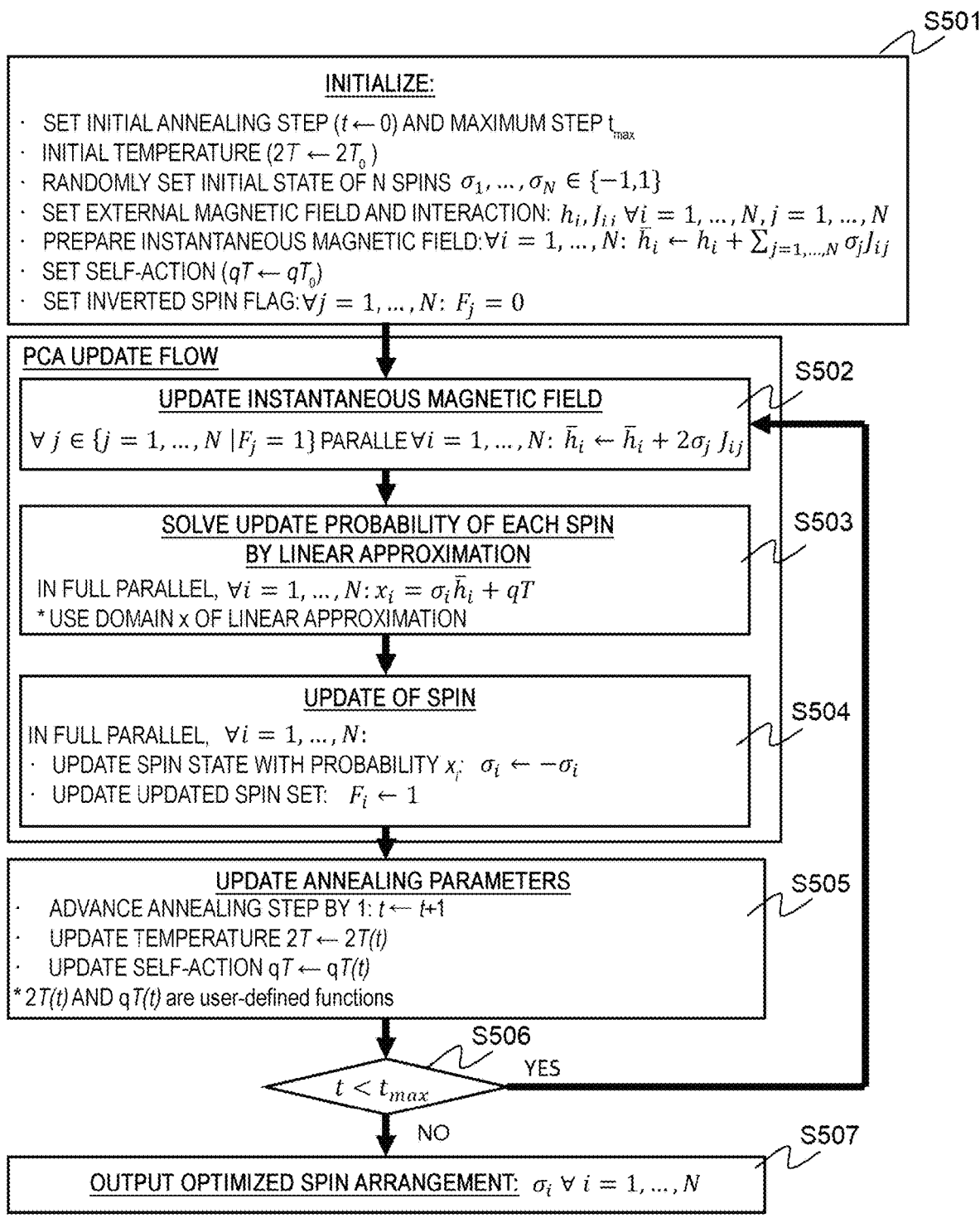
FIG. 5 is a flowchart illustrating processing of an annealing machine according to Example 2.

FIG. 5 is a flowchart illustrating processing in which the annealing machine according to Example 2 updates spins in parallel. It is assumed that the optimization problem has already been modeled in the form of a complete graph.

In Example 2, the update probability of a spin is calculated by $x_i = \sigma_i Ih_i + qT$. An example of calculation will be described again with reference to FIG. 3B. In order to calculate the updated spin state $\sigma'$ on the right side of FIG. 3B based on the current state $\sigma$ on the left side of FIG. 3B, it is necessary to calculate the update probability $x_i = \sigma_i Ih_i + qT$. FIG. 3B illustrates an example of calculation of $x_i$ to obtain a spin (topspin) $\sigma'_i$ at i=1. For the sake of simplicity, consider five spins, and $h_i=0$ and $J_{ii}=0$. $Ih_i = h_i + \Sigma_{j=1\sim 5}\sigma_j j_{ij}$ Therefore, in order to calculate $x_1$ in FIG. 3B, $$x_1 = \sigma_1 Ih_1 + qT$$
$$= qT + \sigma_1 Ih_1$$
$$= qT + \sigma_1(h_1 + \Sigma_{j=1\sim 5}\sigma_j j_{1j})$$
$$= qT + \sigma_1(\sigma_2 J_{21} + \sigma_3 j_{31} + \sigma_4 j_{41} + \sigma_5 j_{51})$$

Here, assuming that the values of spins are $\sigma_1=\sigma_2=\sigma_3=\sigma_5=1$ and $\sigma_4=-1$, $$x_1 = qT + J_{21} + j_{31} - j_{41} + j_{51}$$

<1. Overview of Processing>

Figure 2:
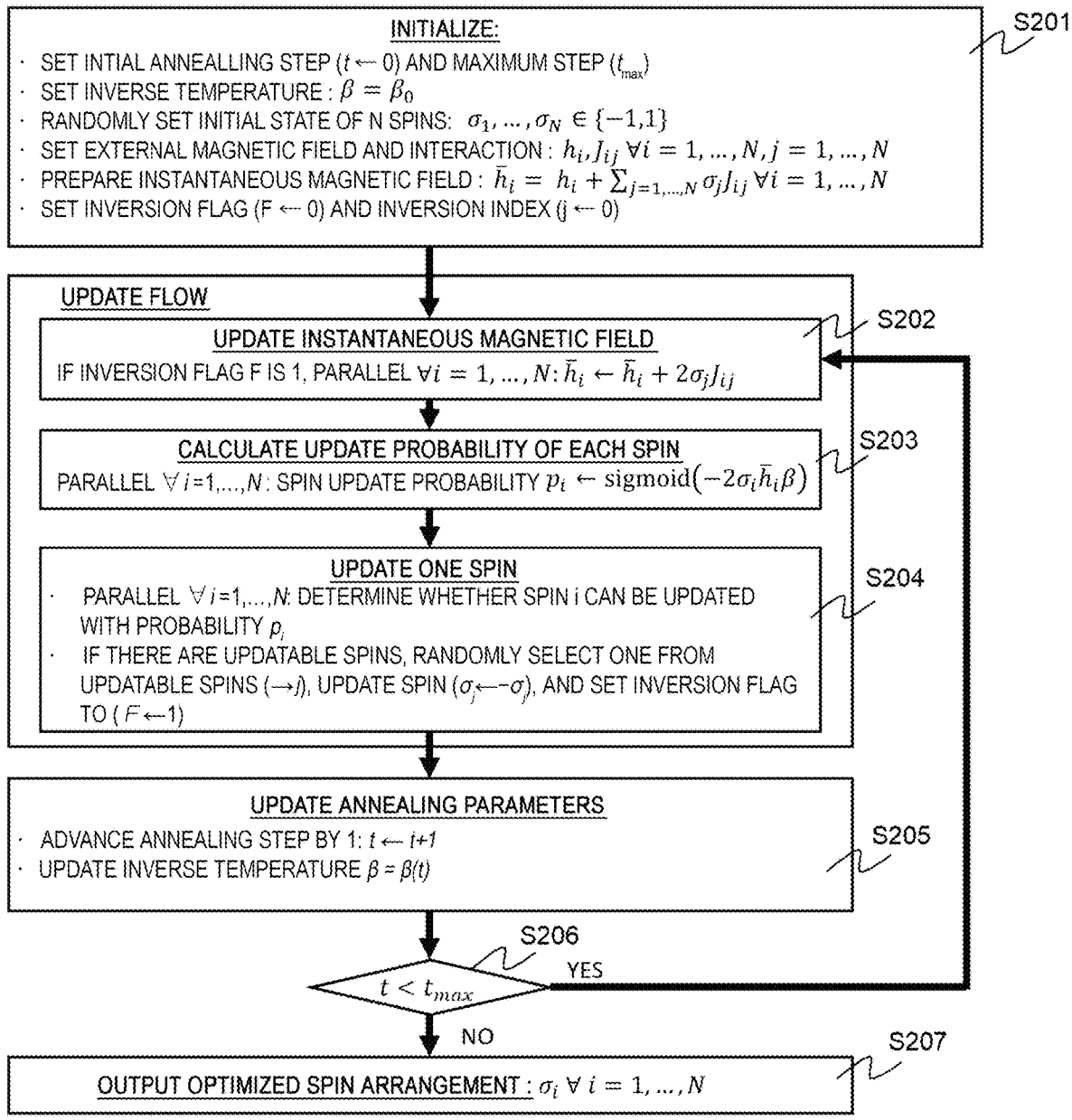
FIG. 2 is a flowchart illustrating processing of the annealing machine that updates spins one by one.

Step S501 is data initialization. The annealing step t is set to an initial value 0. The maximum step (t_max) is set, and how many times the spin update is repeated is set. A temperature 2T or the inverse temperature $\beta(=\frac{1}{2}T)$ is set to an initial value $2T_0$ or $\frac{1}{2}T_0$. An initial state is randomly set for each of N spins (nodes) σ included in the model. The value of a spin may be binary, but here, +1 and -1. The external magnetic field coefficients hi is determined for each node, and an interaction coefficient $j_{ij}$ between the nodes is determined. As in FIG. 2, the instantaneous magnetic field $Ih_i = h_i + \Sigma_{j=1\sim N}\sigma_j j_{ij}$ is prepared. In the present example, the self-action qT is introduced as a parameter, and the self-action is set to an initial value $qT \leftarrow qT_0$. A spin inversion flag F is set for each node, and an initial value $F_j=0$ is set. These data are determined based on the model and set in the annealing machine. Specific structures of the annealing machine are described in International Publication WO 2015-132883, JP-A-2019-16077, JP-A-2019-16129, JP-A-2019-71113, JP-A-2019-87273, and "An accelerator architecture for combinatorial optimization problems", Sanroku Tsukamoto et. Al., Fujitsu Sci. Tech. J., Vol. 53, No. 5 (September 2017). Next, the processing S502 to S504 illustrates a flow of a spin update.

The difference from Example 1 is that the temperature is twice T and the product qT of the temperature is used as the self-action q. The reason will be described later.

In the processing S502, the instantaneous magnetic field is updated. The instantaneous magnetic field $Ih_i$ is calculated and updated in parallel for each spin. Although each spin is updated in parallel in this method, the calculation of the instantaneous magnetic field reflects only the effect of the node with the spin inversion flag $F_j=1$, that is, the node whose spin has been updated. That is, $Ih_i \leftarrow Ih_i + 2j_{ij}\sigma_j$.

In the processing S503, an update probability $x_i$ of each spin is calculated and updated in parallel.

$$x_i = \sigma_i Ih_i + qT$$

Here, a function obtained by linearly approximating the sigmoid function is used for $x_i$.

In the processing S504, whether or not each spin can be updated is determined based on the spin update probability $x_i$ and updated in parallel. For the spin to be updated, $\sigma_i \leftarrow -\sigma_i$. In addition, the spin inversion flag of the updated spin set is updated so that $F_i \leftarrow 1$. In the processing S505, the annealing step is advanced by one ($t \leftarrow t+1$). Further, the temperature or the inverse temperature is updated (($2T \leftarrow 2T(t)$) or ($\beta/2 \leftarrow \beta/2(t)$)). The temperature 2T gradually decreases as the step proceeds, and the reciprocal inverse temperature $\beta/2$ gradually increases. Further, the self-action qT is updated ($qT \leftarrow qT(t)$). Here, 2T(t), $\beta/2$ (t), and qT (t) are functions defined by the user. The conditions for setting the self-action qT(t) are the same as in Example 1.

The processing S502 to S505 are repeated until the annealing step t reaches t_max in the determination processing S506. When the annealing step t reaches t_max, the spin arrangement $\sigma_i$ is read and output as a (pseudo) optimized spin arrangement (S507).

<2. Overview of Apparatus Configuration>

Figure 6:
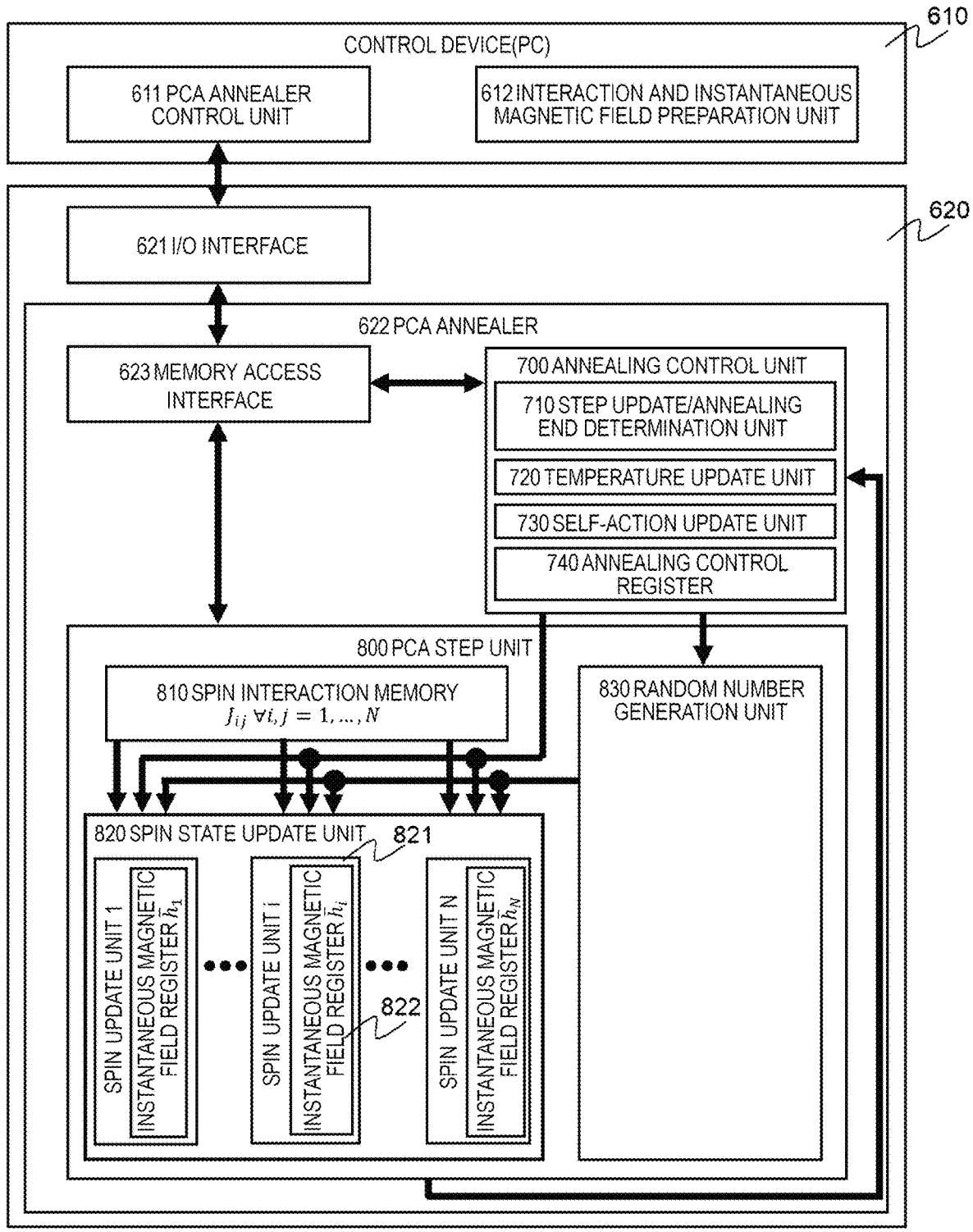
FIG. 6 is a block diagram illustrating a configuration example of the annealing machine.

FIG. 6 is a block diagram illustrating a configuration of an information processing apparatus for executing the processing of FIG. 5. The information processing apparatus includes a control device 610 and an annealing machine 620.

<2.1. Control Apparatus>

The control device 610 is, for example, a personal computer (PC) and includes a PCA annealing control unit 611 and an interaction/instantaneous magnetic field preparation unit 612. The control device 610 controls the annealing machine 620 as a higher-level device. Further, the control device 610 executes the initialization processing S501.

The PCA annealing control unit 611 performs overall control of the annealing machine 620, such as inputting/outputting data to/from the annealing machine 620, setting of an annealing step and various parameters. The interaction/instantaneous magnetic field preparation unit 612 converts the optimization problem into an Ising model, and calculates and prepares an interaction coefficient $j_{ij}$, an external magnetic field coefficient $h_i$, and an instantaneous magnetic field $Ih_i$. The PCA annealing control unit 611 inputs these data to the annealing machine 620 and sets the data.

The control device 610 includes an input device, an output device, a processing device, and a storage device, like a normal PC. In the present example, functions such as calculation and control are realized by executing a program stored in the storage device by the processing device in cooperation with other hardware. A program executed by a computer or the like, a function, or means for realizing the function may be referred to as "function", "means", "unit", "module", or the like.

The above configuration may be configured by a single computer, or any part of the input device, the output device, the processing device, and the storage device may be configured by another computer connected via a network. In the present example, the functions equivalent to the functions configured by software can be realized by hardware such as a field programmable gate array (FPGA) and an application specific integrated circuit (ASIC).

<2.2. Annealing Machine>

The annealing machine 620 includes an I/O interface 621 and a PCA annealer 622. The PCA annealer 622 includes a memory access interface 623, an annealing control unit 700, and a PCA step unit 800. The annealing machine 620 is a circuit dedicated to annealing that performs annealing.

The I/O interface 621 controls transmission and reception of data between the annealing machine 620 and the control device 610. The memory access interface 623 records and reads data to and from various memories included in the annealing machine 620.

<3. PCA Annealer>

The PCA annealer 622 exchanges data with the control device 610 via the I/O interface 621. The memory access interface 623 stores the data received from the I/O interface 621 in a memory in the PCA annealer 622. Further, data is read from the memory to the control device 610 via the I/O interface 621. Writing and reading of data to and from the memory can be configured by applying, for example, a static random access memory (SRAM) technology. Such hardware is described in International Publication WO 2015-132883, for example.

The annealing control unit 700 includes a step update/annealing end determination unit 710, a temperature update unit 720, a self-action update unit 730, and an annealing control register 740. The annealing control unit 700 performs initial value setting and updating of various parameters for updating spins in the annealing process. The annealing control unit 700 can be composed of, for example, a microcomputer. The annealing control register 740 stores the current temperature 2T and the value of the self-action qT and the change parameters thereof, the current number of steps t, and the maximum number of steps $t_{max}$. The temperature update unit 720 and the self-action update unit 730 update the temperature and the self-action by using the numerical values of the annealing control register 740.

The PCA step unit 800 includes a spin interaction memory 810, a spin state update unit 820, and a random number generation unit 830. The spin interaction memory 810 stores the interaction coefficient $j_{ij}$. The spin state update unit 820 includes N spin update units 821, and each spin update unit 821 includes an instantaneous magnetic field register 822. The PCA step unit 800 updates the values of the spins of the N spin update units 821 in parallel. In addition, the values of the instantaneous magnetic fields of the N instantaneous magnetic field registers 822 are updated in parallel. The random number generation unit 830 generates random numbers.

<3. Annealing Control Unit>

<3.1. Overall Configuration>

Figure 7A:
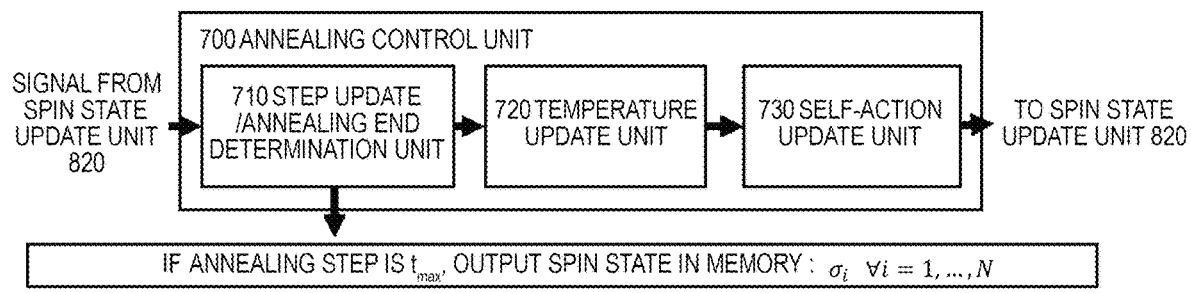
FIG. 7A is a block diagram illustrating functions of an annealing control unit.

FIG. 7A is a diagram illustrating the function of the annealing control unit 700. The signal from the spin state update unit 820 is input to the annealing control unit 700. When a signal (step end signal) indicating the completion of the update of the spin state is obtained from the spin state update unit 820, the number of steps is incremented, and the contents of the annealing control register 740 are updated by the step update/annealing end determination unit 710, the temperature update unit 720, and the self-action update unit 730.

The step update/annealing end determination unit 710 determines whether the annealing step has reached the maximum value $t_{max}$ and outputs N spin states in an inverted spin buffer 826 if the annealing step is the maximum value. The N spin states are output to the control device 610 as an optimized spin arrangement via the memory access interface 623 and the I/O interface 621. If the annealing step is not the maximum value, the annealing step t←t+1 is set, the temperature update unit 720 updates the temperature 2T, the self-action update unit 730 updates the self-action qT and updates the value of the annealing control register 740. The updated temperature 2T and self-action qT are output to the spin state update unit 820.

<3.2. Step Update/Annealing End Determination Unit>

Figure 7B:
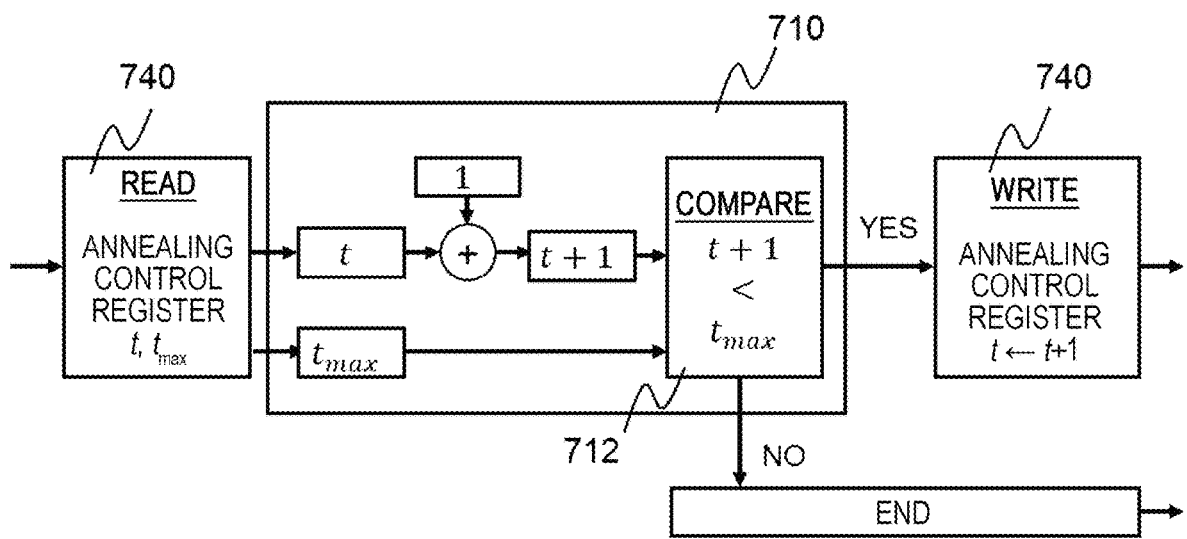
FIG. 7B is a detailed block diagram of a step updating/annealing end determination unit.

FIG. 7B is a detailed block diagram of the step update/annealing end determination unit 710. Upon receiving the step end signal from the spin state update unit 820, the step update/annealing end determination unit 710 reads the current number of annealing steps t and the maximum number of steps $t_{max}$ from the annealing control register 740. One is added to the current number of annealing steps t (t←t+1). A comparator 712 ends the annealing step if $t+1 < t_{max}$ and updates the number of annealing steps t of the annealing control register 740 if $t+1 < t_{max}$ (t←t+1).

<3.3. Temperature Update Unit and Self-Action Update Unit>

Figure 7C:
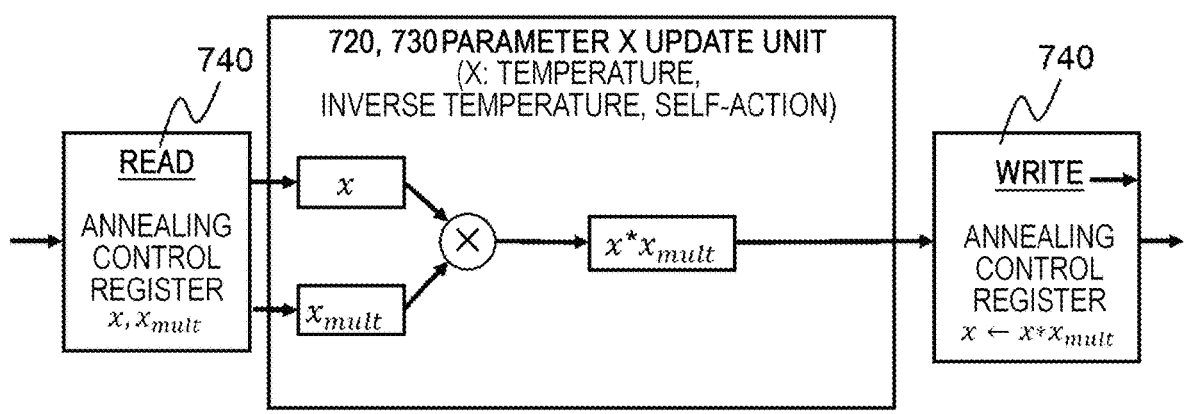
FIG. 7C is a detailed block diagram of a temperature update unit and a self-action update unit.

FIG. 7C is a detailed block diagram of the temperature update unit 720 and the self-action update unit 730. Since the temperature update unit 720 and the self-action update unit 730 have the same configuration as the parameter update unit, both will be described as a parameter X update unit. In the drawing, $(x, x_{mult})$ represents $(2T, 2T_{mult})$ or $(\beta/2, \beta/2_{mult})$, and $(qT, qT_{mult})$, respectively.

When a step end signal is obtained from the spin state update unit 820, a current parameter x and a parameter update parameter $x_{mult}$ are read from the annealing control register 740. The parameter x and the parameter update parameter $x_{mult}$ are integrated, and $x \leftarrow x * x_{mult}$ is written to the annealing control register 740 as a new parameter.

<4. PCA Step Unit>

<4.1. Overall Configuration>

Figure 8A:
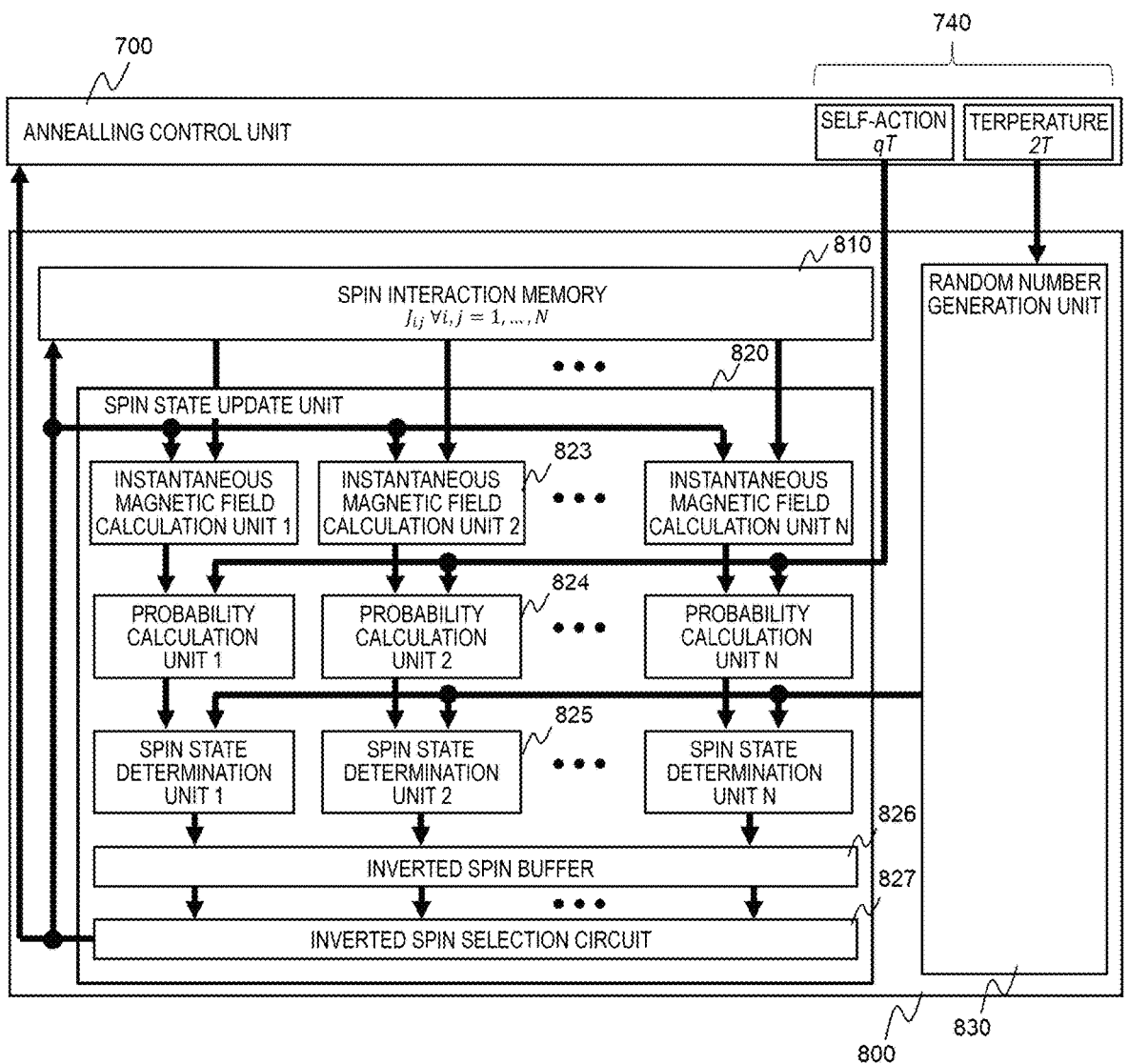
FIG. 8A is a block diagram illustrating details of the annealing control unit and a PCA step unit.

FIG. 8A is a block diagram illustrating details of the annealing control unit 700 and the PCA step unit 800. The spin interaction memory 810 stores the interaction coefficient $j_{ij}$ at each of the nodes corresponding to the N spins. The specific hardware configuration is described in detail in, for example, International Publication WO 2015-132883 to which SRAM technology is applied.

The temperature 2T is input from the annealing control register 740 of the annealing control unit 700 to the random number generation unit 830, and random numbers having a value in the range of −2T to 2T are generated. Different random numbers are input to a spin state determination unit 825.

The spin value is updated by the spin state update unit 820. The spin state update unit 820 includes an instantaneous magnetic field calculation unit 823, a probability calculation unit 824, a spin state determination unit 825, an inverted spin buffer 826, and an inverted spin selection circuit 827. The self-action qT is input from the annealing control register 740 of the annealing control unit 700 to the spin state update unit 820. The random numbers are input from the random number generation unit 830. The interaction coefficient $j_{ij}$ is input from the spin interaction memory. Based on these, the state of each spin is updated.

<4.2. Instantaneous Magnetic Field Calculation Unit>

Figure 8B:
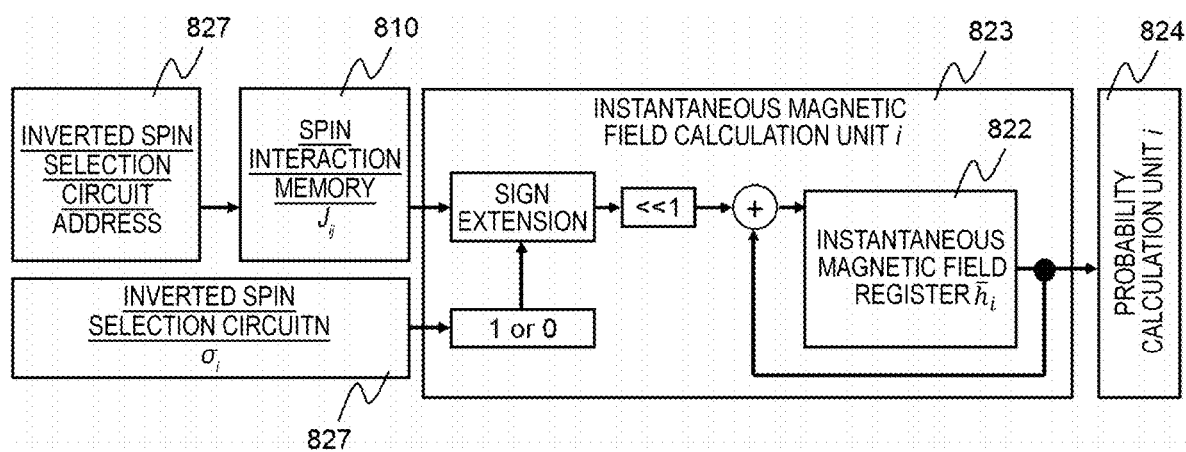
FIG. 8B is a functional block diagram of an instantaneous magnetic field calculation unit.

FIG. 8B is a block diagram illustrating the instantaneous magnetic field calculation unit 823. The instantaneous magnetic field calculation unit 823 reads, as inputs, the value $j_{ij}$ of the interaction coefficient of the spin interaction memory 810 and the value $\sigma_i$ of the spin of the inverted spin selection circuit. The value $j_{ij}$ of the interaction coefficient corresponds to the address specified by the inverted spin selection circuit 827 and corresponds to one or a plurality of spins $\sigma_j$ updated in the previous annealing step.

The spin value $\sigma_j$ having +1 or minus −1 is sign-extended. "<<1" means to shift a bit one place to the left, which is the same as multiplying by 2. Thereby, $2\sigma_j j_{ij}$ is calculated. $2\sigma_j j_{ij}$ is added to the value of the current instantaneous magnetic field $Ih_i$ of the instantaneous magnetic field register 822, and a new instantaneous magnetic field value is written to the instantaneous magnetic field register 822 as $Ih_i \leftarrow Ih_i + 2\sigma_j j_{ij}$. The value of the instantaneous magnetic field $Ih_i$ is input to the probability calculation unit 824.

As described in FIG. 5, in the calculation of $Ih_i + 2\sigma_j j_{ij}$, $j \in \{j=1, \ldots, N | F_j = 1\}$. The inverted spin selection circuit 827 sets the value of the inversion flag $F_1$ of the spin updated in the previous annealing step to "1" ($F_j = 1$) and specifies the updated spin. Therefore, the instantaneous magnetic field calculation unit 823 calculates the instantaneous magnetic field based on the spin whose spin has been updated (changed) in the annealing step.

<4.3. Probability Calculation Unit>

Figure 9A:
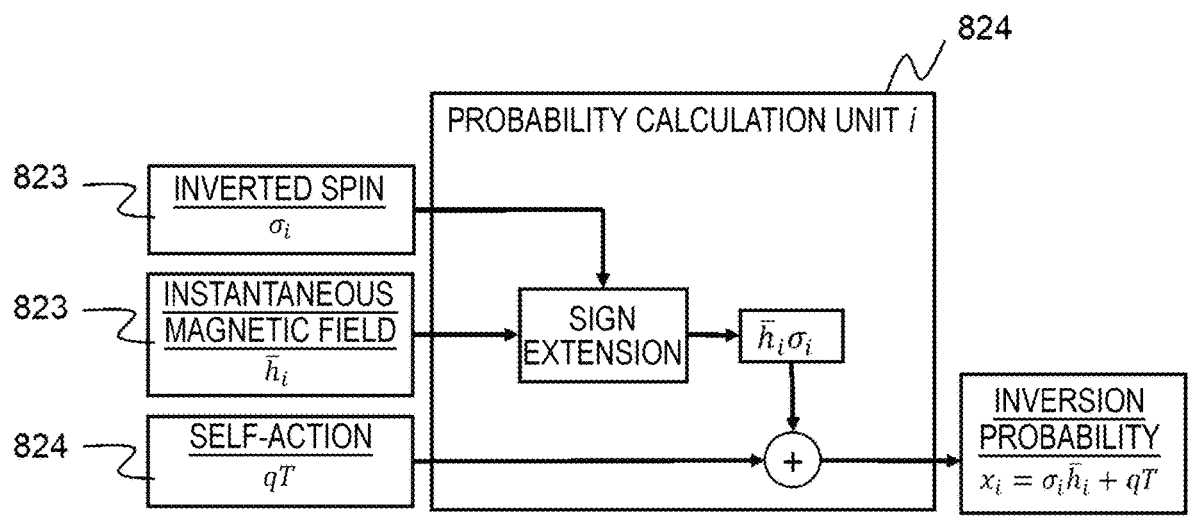
FIG. 9A is a functional block diagram of a probability calculation unit.

FIG. 9A is a diagram illustrating details of the probability calculation unit 824 for calculating the inversion probability $x_i$. The probability calculation unit 824 receives the value of the spin $\sigma_i$ of the inverted spin selection circuit as an input (may be taken over from the instantaneous magnetic field calculation unit 823), the instantaneous magnetic field $Ih_i$ obtained from the instantaneous magnetic field calculation unit 823, and the self-action qT obtained from the annealing control register 740 of the annealing control unit 700.

The sign value of the value of the spin $\sigma_i$ having +1 or −1 is sign-extended, and the instantaneous magnetic field $Ih_i\sigma_i$ is calculated and added to the self-action qT. Thereby, the inversion probability $x_i = \sigma_i Ih_i + qT$ is obtained.

<4.4. Spin State Determination Unit>

Figure 9B:
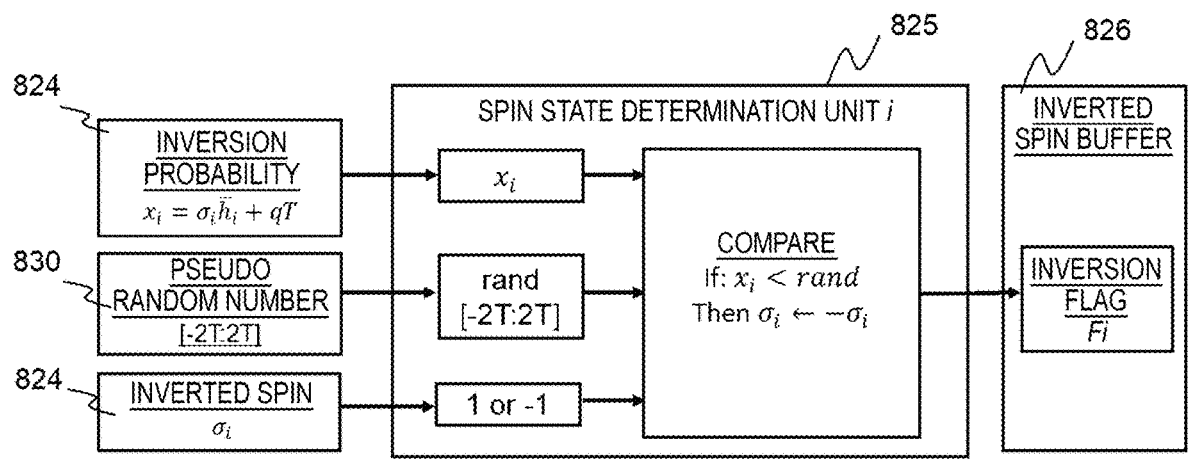
FIG. 9B is a functional block diagram of a spin state determination unit.

FIG. 9B is a diagram illustrating details of the spin state determination unit 825 for determining a spin update. The spin state determination unit 825 obtains an inversion probability $x_i$ obtained from the probability calculation unit 824 as an input, a pseudo random number obtained from the random number generation unit 830, and the value of the spin $\sigma_1$ of the inverted spin selection circuit (may be taken over from the probability calculation unit 824). The random number generation unit 830 gives different random numbers to each of the N spin state determination units 825. Generation of random numbers in the random number generation unit 830 is controlled at a temperature of 2T. The values that the random numbers take range from −2 to 2T.

The spin state determination unit 825 compares the inversion probability $x_i$ with a random number and inverts the sign of the value of the spin $\sigma_i$ if the inversion probability $x_i$ is smaller than the random number. When the spin is inverted, the inversion flag $F_i$ of the inverted spin buffer 826 is set. As described above, $F_i$ is set to "1" when the spin $\sigma_i$ is inverted by the spin state determination unit 825 and is set to "0" when the spin $\sigma_1$ is not inverted by the spin state determination unit 825.

<4.5. Spin Update Time Chart>

FIG. 9C is a time chart of updating the spin state when i=1. The instantaneous magnetic field calculation unit 823 updates the instantaneous magnetic field $Ih_i$ ($Ih_1 \leftarrow Ih_1 + 2\sigma_j j_{1j}$) by adding a change in the instantaneous magnetic field due to the spin updated in the previous annealing step and stores the instantaneous magnetic field $Ih_i$ in the instantaneous magnetic field register 822. After obtaining the instantaneous magnetic field, the self-action qT is obtained from the annealing control unit 700, and a random number rand is obtained from the random number generation unit 830. The probability calculation unit 824 calculates the inversion probability $x_i$ from the self-action qT, the instantaneous magnetic field $Ih_i$, and the spin $\sigma_1$. The spin state determination unit 825 determines whether or not to update the spin from the inversion probability $x_i$, the random number rand, and the spin $\sigma_i$, sets an inversion flag $F_1$ of the inverted spin buffer 826, and updates the spin $\sigma_1$.

<4.6. Inverted Spin Buffer and Inverted Spin Selection Circuit>

Figure 10A:
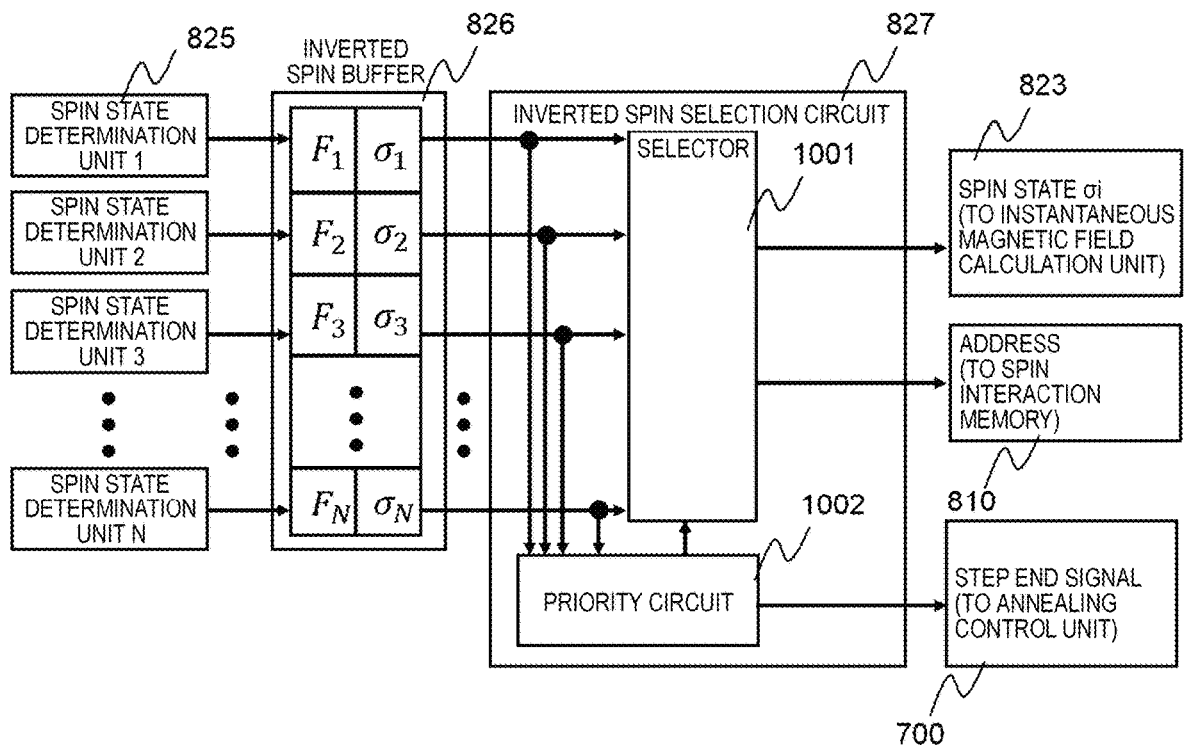
FIG. 10A is a block diagram of an inverted spin buffer and an inverted spin selection circuit.

FIG. 10A is a diagram illustrating details of the inverted spin buffer 826 and the inverted spin selection circuit 827. The inversion flag $F_i$ and the value of the spin $\sigma_i$ (i indicates the number of the spin (node)) generated by the spin state determination unit 825 corresponding to each of the N spins are written in the inverted spin buffer 826 in parallel. The inversion flag $F_i$ may be, for example, a sign of an arbitrary bit indicating "1" or "0". As described above, the inversion flag $F_i$ indicates whether the spin $\sigma_i$ has been updated.

The value of the spin $\sigma_1$ is sent to the corresponding instantaneous magnetic field calculation unit 823 via a selector 1001 of the inverted spin selection circuit 827. The address of the spin for which the value of the inversion flag $F_i$ is "1" is sent to a spin interaction memory 310. The spin interaction memory 310 sends the interaction $j_{ij}$ specified by the address to the instantaneous magnetic field calculation unit 823.

When the transmission of all data is completed, a priority circuit 1002 transmits a step end signal to the annealing control unit 700. Upon receiving the step end signal, the annealing control unit 700 starts the next step.

<4.7. Example of Inversion Flag>

FIG. 10B is a diagram illustrating the function of the inverted spin selection circuit 827. Here, the function of the inversion flag will be described for a system having only four spins of $\sigma_1$, $\sigma_2$, $\sigma_3$, and $\sigma_4$. It is assumed that $\sigma_1$, $\sigma_2$, and $\sigma_4$ have spins updated by the spin state determination unit 825, and $\sigma_3$ has a spin not updated. That is, the spin state determination unit 825 sets the inversion flag to $F_1=F_2=F_4=1$ and $F_3=0$ and sets the inversion flags in the inverted spin buffer 826.

In cycle 1 in which the inverted spin selection circuit 827 starts processing, the inversion flag is set to "$F_4F_3F_2F_1$"="1011". The priority circuit 1002 knows from the inversion flag "1011" that $F_4=1$ and the spin of $\sigma_4$ has been updated. Therefore, the selector 1001 sends the updated spin $\sigma_4$ of the inverted spin buffer to the instantaneous magnetic field calculation unit 823 and sends the corresponding address "11" to the spin interaction memory 810. The spin interaction memory 810 sends $j_{41}$, $j_{42}$, and $j_{43}$ corresponding to the address "11" to the instantaneous magnetic field calculation unit 823. Next, $F_4=0$ is set, and the inversion flag is changed to "0011".

In cycle 2, the inversion flag is changed to "$F_4F_3F_2F_1$"="0011". The priority circuit 1002 knows from the inversion flag "0011" that $F_2=1$ and the spin of $\sigma_2$ has been updated. Therefore, the selector 1001 sends the updated spin $\sigma_2$ of the inverted spin buffer to the instantaneous magnetic field calculation unit 823 and sends the corresponding address "01" to the spin interaction memory 810. Next, $F_2=0$ is set, and the inversion flag is changed to "0001".

The same applies to the following cycles. If the inversion flag eventually becomes all zeros, the priority circuit 1002 determines that the processing has been completed and generates a step end flag. Then, a step end signal is sent to the annealing control unit 700.

<5. Calculation of Spin Inversion Probability>

In Example 1, it has been described that a sigmoid function is generally used as the spin update probability p. However, when the sigmoid function is used, the calculation load is large. Therefore, the use of linear approximation to reduce the circuit scale and the amount of calculation was studied.

FIG. 11A illustrates the concept of linearly approximating a sigmoid function. Here, the spin update probability $p_i$ is defined by the following sigmoid function.

$$p_i = \text{sigmoid}(-x_i/T)$$

$$x_i = \sigma_i I h_i + qT$$

If $p_i > \text{rand}'' \in (0,1)$, the spin is inverted and $\sigma_i \leftarrow -\sigma_i$.

Here, $p_i$ is linearly approximated as follows. When $x_i < -2T$, $p_i \cong 1$
When $-2T \leq x_i \leq 2T$, $p_i \cong \frac{1}{2} - x_i/4T$
When $2T < x_i$, $p_i \cong 0$
If $pi > \text{rand}''$, the spin is inverted and $\sigma_i \leftarrow -\sigma_i$.

As described above, in the graph of FIG. 11A, the sigmoid function indicated by the dotted line (1) can be linearly approximated as indicated by the solid line (2).

Figure 11B:
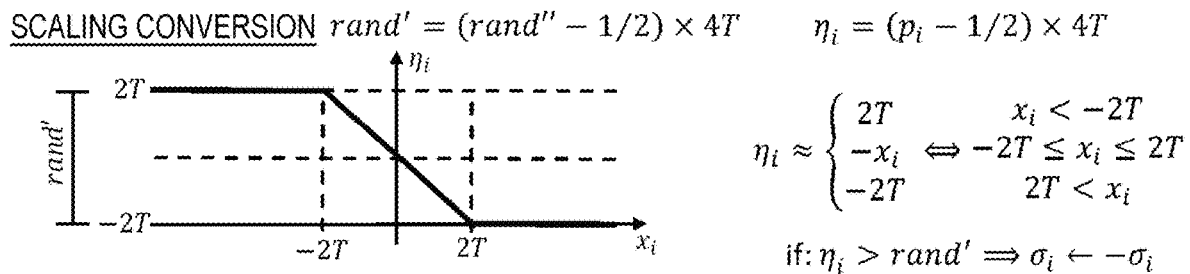
FIG. 11B is an explanatory diagram of scale conversion of a linear approximation graph.

FIG. 11B is a graph obtained by scale conversion of the linear approximation graph of FIG. 11A. In FIG. 11A, the value of a random number rand" is between 0 and 1. This value is converted to scale into a random number rand' having a value between −2T and 2T. This conversion can be performed as follows.
rand'=(rand"−½)×4T
A spin update probability n is as follows.
$\eta_i = (p_i - \frac{1}{2}) \times 4T$
By linear approximation,
When $x_i < -2T$, $\eta_i \cong 2T$
When $-2T \leq x_i \leq 2T$, $\eta_i \cong -x_i$
When $2T < x_i$, $\eta_i \cong -2T$
If $\eta_i > \text{rand}'$, the spin is inverted and $\sigma_i \leftarrow -\sigma_i$.

Figure 11C:
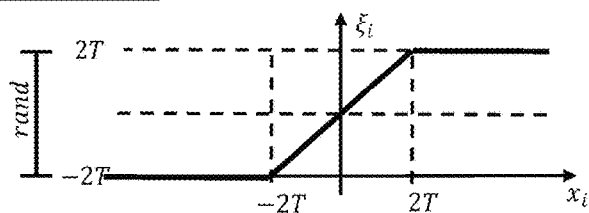
FIG. 11C is an explanatory diagram of sign conversion of the linear approximation graph after scale conversion.

FIG. 11C is a graph obtained by performing code conversion on the graph obtained by performing the scale conversion in FIG. 11B. By sign conversion,
rand=−rand'.
A spin update probability $\xi$ is as follows.
$\xi_i = -\eta_i$
By linear approximation,
When $x_i < -2T$, $\xi_i - 2T$
When $-2T \leq x_i \leq 2T$, $\xi_i \cong x_i$
When $2T < x_i$, $\xi_i \cong 2T$
If $\xi_i < \text{rand}$, the spin is inverted and $\sigma_i \leftarrow -\sigma_i$.

Figure 11D:
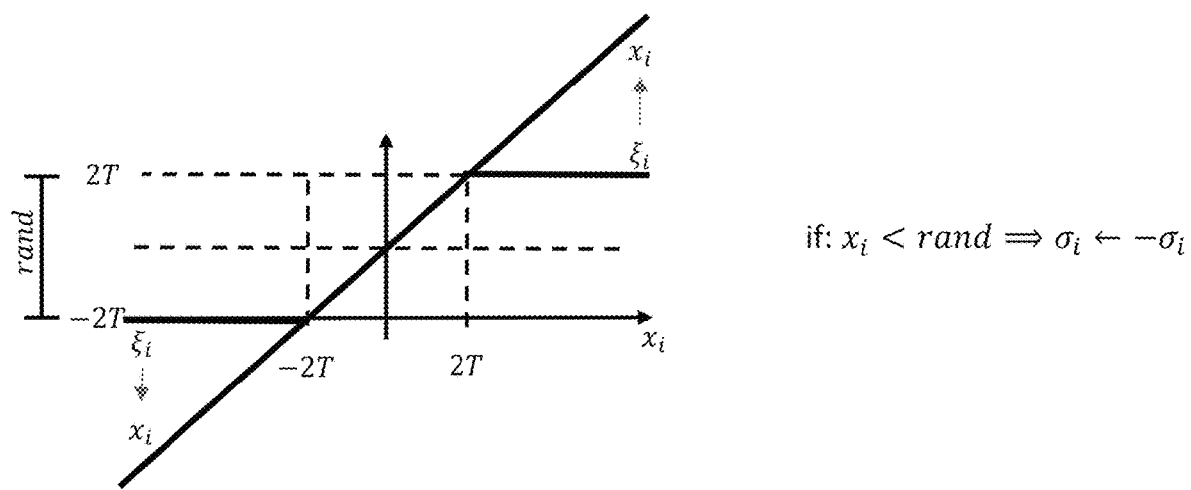
FIG. 11D is an explanatory diagram illustrating a relationship between spin inversion probabilities x and $\xi$.

FIG. 11D illustrates $\xi_i$ and $x_i$ superimposed. As described above, when $-2T \leq x_i \leq 2T$, $\xi_i \cong x_i$, and therefore, even if $x_i$ is used instead of $\xi_i$, the comparison result of the random numbers does not change. Therefore, if $x_i < \text{rand}$, the spin can be inverted and $\sigma_i \leftarrow -\sigma_i$.

<6. Processing Flow of Spin Update>

Figure 12A:
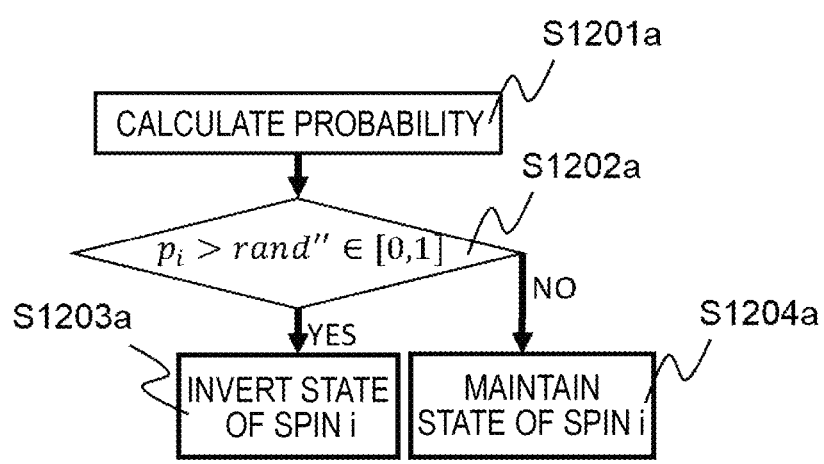
FIG. 12A is a processing flowchart of updating a spin using the spin inversion probability p.

FIG. 12A illustrates a processing flow of updating a spin by using the spin inversion probability p in FIG. 11A. $P_i$ is obtained by calculating the inversion probability (S1201a). $p_i$ is compared with a random number rand" having a value between 0 and 1 (S1202a). If $p_i$ is larger than the random number rand", the spin state is inverted (S1203a). If $p_i$ is not larger than the random number rand", the spin state is maintained (S1204a).

Figure 12B:
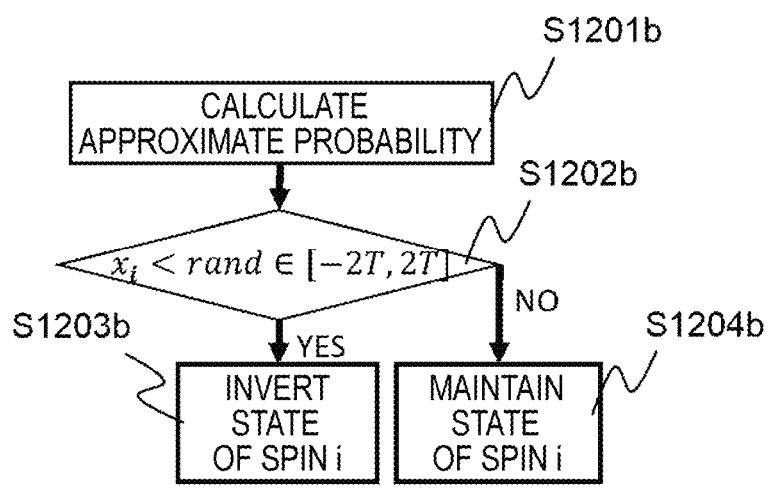
FIG. 12B is a processing flowchart of updating a spin using the spin inversion probability x.

FIG. 12B illustrates a processing flow of a spin update using the spin inversion probability $x_i$ of FIG. 11D. $x_i$ is obtained by calculating the inversion probability (S1201b). $x_i$ is compared with a random number rand taking a value between −2T and 2T (S1202b). If $x_i$ is smaller than the random number rand, the spin state is inverted (S1203b). If $x_i$ is not smaller than the random number rand, the spin state is maintained (S1204b).

<7. Processing of Spin Update Circuit>

Figure 12C:
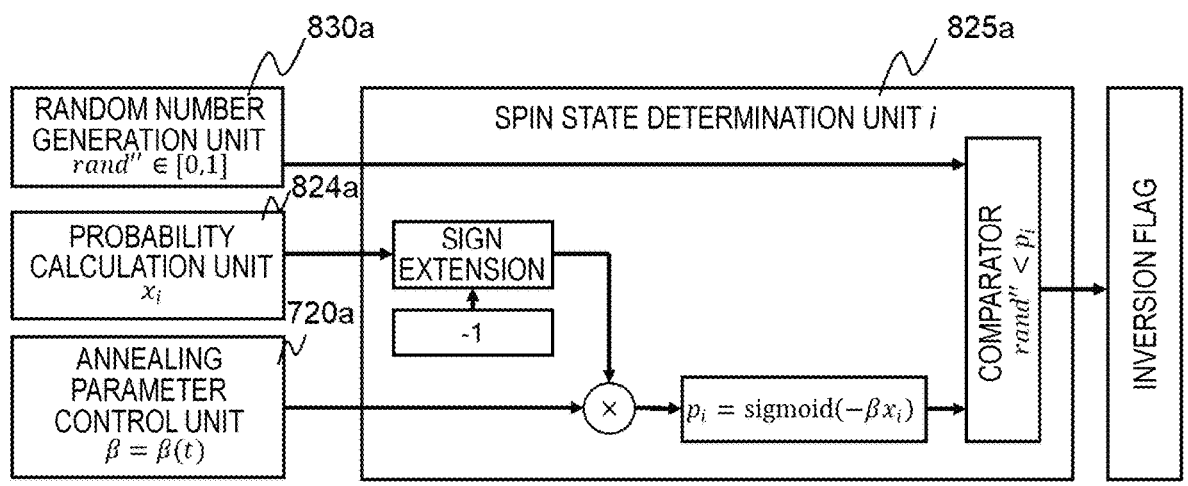
FIG. 12C is a functional block diagram of the spin state determination unit using the spin inversion probability p.

FIG. 12C illustrates a configuration of a spin state determination unit 825a using a sigmoid function p of FIG. 12A. Inputs are a random number rand" that takes a value between 0 and 1 obtained from the random number generation unit 830a, $x_i$ obtained from the probability calculation unit 824a, and an inverse temperature $\beta(t)=1/T(t)$ obtained from a temperature update unit 720a. In order to obtain $p_i=\text{sigmoid}(-x_i/T)$, it is necessary to calculate a sigmoid function $p_i$ by inverting and integrating the sign of $x_i$.

Figure 12D:
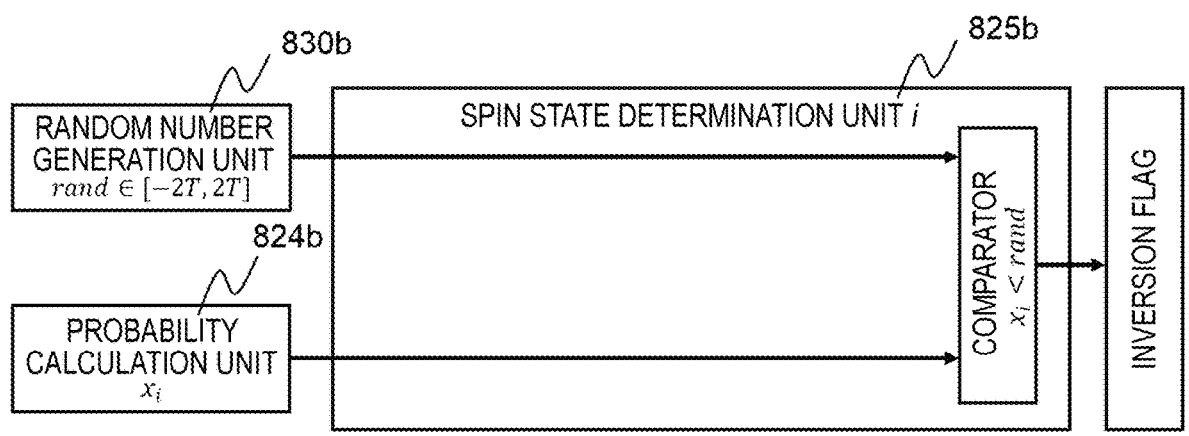
FIG. 12D is a functional block diagram of the spin state determination unit using the spin inversion probability x.

FIG. 12D illustrates a configuration of the spin state determination unit 825b using the function x obtained by performing the linear approximation and the scale conversion of FIG. 12B. The inputs are a random number rand that takes a value between −2T and 2T obtained from the random number generation unit 830b and $x_i$ obtained from the probability calculation unit 824b. In this method, it is only necessary to compare the random number rand and $x_i$. No sign extension and integrator are required, and there is no need to calculate the sigmoid function $p_i$.

<8. Method for Generating Random Numbers>

Figure 13A:
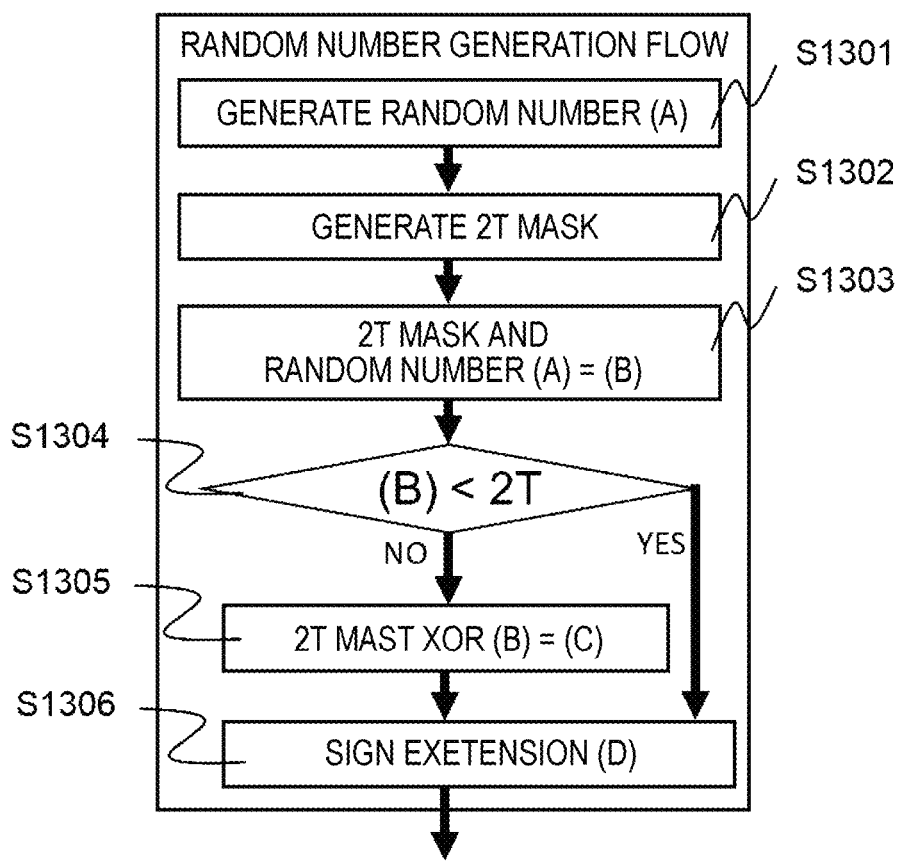
FIG. 13A is a flowchart of random number generation according to the example.

FIG. 13A is a flow of generating a random number taking a value between −2T and 2T in the random number generation unit 830.

Figure 13B:
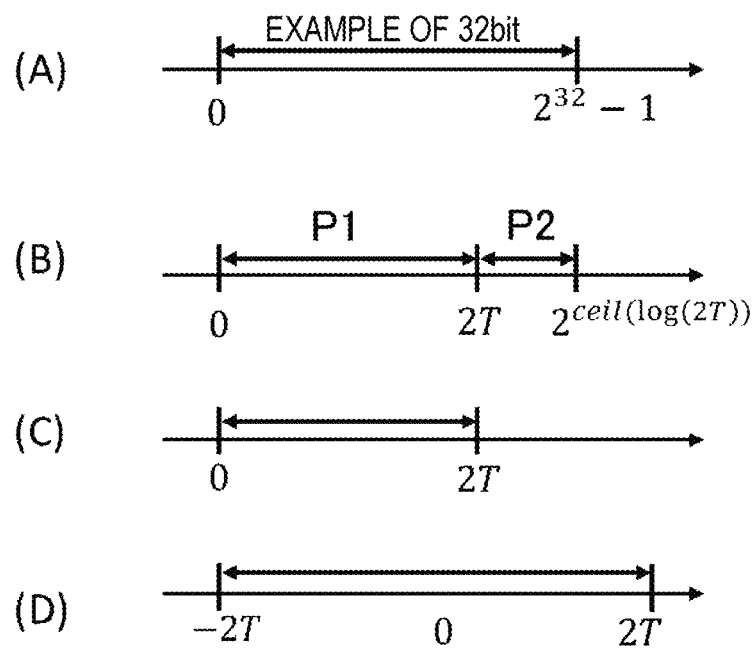
FIG. 13B is a conceptual diagram illustrating random number generation processing according to the example.

FIG. 13B is a conceptual diagram illustrating random number generation processing in the random number generation unit 830. The random number generation unit 830 gives different random numbers to each spin state determination unit 825. Here, the generation of one of the random numbers will be described, but a similar configuration may be operated in parallel by the number N of spins.

First, a random number of predetermined bits (for example, 32 bits) is generated by a known method (S1301). FIG. 13BA illustrates the generated 32-bit random number (hereinafter, referred to as "random number (A)").

Next, the random number generation unit 830 creates a 2T mask (S1302). The 2T mask is obtained by changing the bits of the 2T below the most significant bit where 1 exists to 1s. For example, when 2T is "01010", the 2T mask is "01111".

Then, a logical product (AND) of the 2T mask and the random number (A) is obtained (S1303). (B) of FIG. 13B illustrates an AND result of the 2T mask and the generated random number (hereinafter, referred to as "AND result (B)"). By taking an AND with the 2T mask, the random number (A) is cut out up to the same digit as the most significant bit of the 2T mask. However, the AND result (B) may still be greater than 2T. Here, the value of the AND result (B) from 0 to 2T is $P_1$, and the value from 2T to $2^{ceil(log)(2T)}$ is P2. ceil is a function that returns the smallest integer greater than or equal to the number given as an argument.

Next, the AND result (B) is compared with 2T (S1304). If the AND result is not smaller than 2T, the exclusive OR (XOR) of the AND result (B) and the 2T mask is taken. (C) of FIG. 13B illustrates the AND result (B) and the result of XOR of the 2T mask (hereinafter, referred to as "XOR result (C)"). By taking the XOR with the 2T mask, if the most significant bit of the AND result (B) is "1", the bit is changed to "0", and therefore the XOR result (C) becomes smaller than 2T. The XOR result (C) is sign-extended to obtain a value (D) between −2T and 2T. (D) of FIG. 13B illustrates the result (D) of sign extension.

When the AND result (B) is smaller than 2T, the sign of the AND result (B) is directly extended to obtain a random number from −2T to 2T.

Figure 13C:
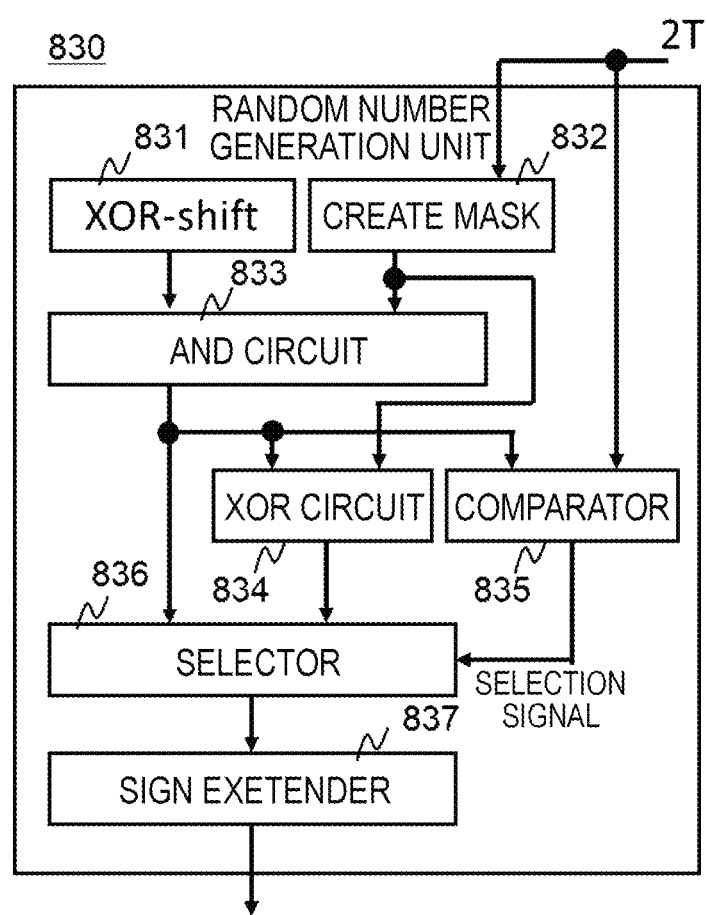
FIG. 13C is a block diagram of a random number generation unit according to the example.

FIG. 13C is a configuration example of the random number generation unit 830 that realizes the above processing. A random number (A) is generated by using an XOR-shift 831, which is one of the pseudo random number sequence generation methods (S1301). 2T is entered, which is arbitrarily determined. A mask creating unit 832 creates a 2T mask based on the 2T (S1302). An AND circuit 833 takes the logical product (AND) of the 2T mask and the random number (A) (S1303).

A comparator 835 compares the AND result (B) with 2T (S1304). The comparison result is input to a selector 836. When the AND result (B) is smaller than 2T, the selector 836 inputs the AND result (B) to a sign extender 837. When the AND result (B) is not smaller than 2T, the selector 836 inputs the exclusive OR (XOR) of the AND result (B) and the 2T mask generated by an XOR circuit 834 to the sign extender 837. The sign extender 837 generates a random number of 2T from −2T.

As described above, in the present example, the calculation speed is increased by the parallel processing. In addition, by compressing the amount of individual calculations in the parallel processing, the circuit configuration is simplified, the power consumption is reduced, and the processing speed is further increased.

Example 3

In Example 2, as described with reference to FIG. 10B, the processing of the updated spins is sequentially executed by the selector 1001 one by one. That is, the processing of transmitting the spin state to the instantaneous magnetic field calculation unit 823 and reading the spin interaction memory 810 by the inverted spin selection circuit 827 requires the number of cycles proportional to the number of spins. In Example 3, an example in which the processing time is reduced by parallelizing this part will be described.

Figure 14:
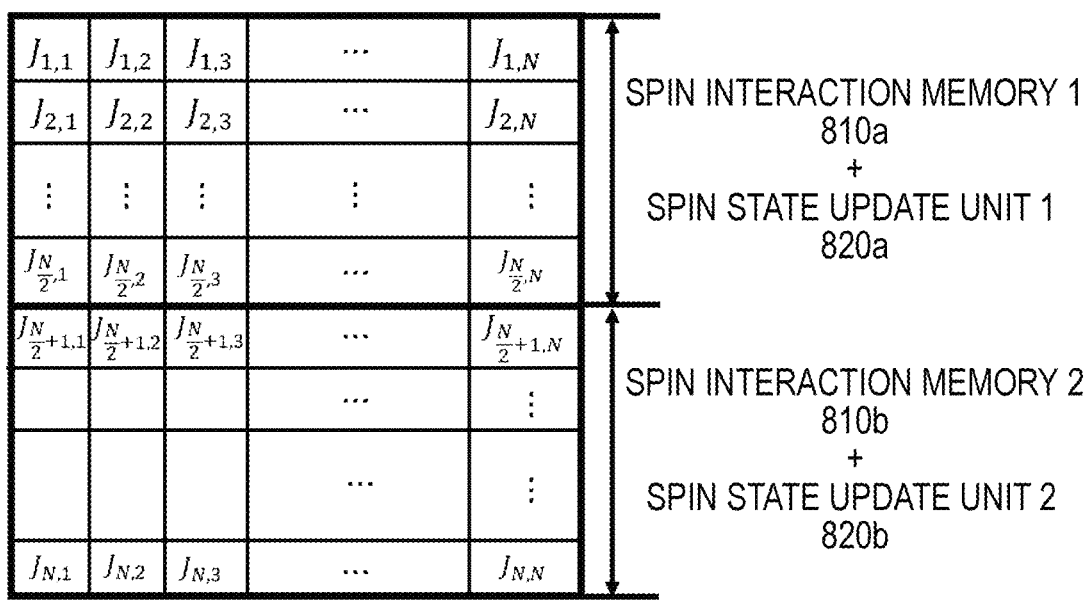
FIG. 14 is a conceptual diagram of a system according to Example 3.

FIG. 14 is a conceptual diagram of a system according to Example 3. The system is divided into a plurality of circuits that can operate in parallel, like spin interaction memories 810a and 810b and spin state update units 820a and 820b. The spin interaction memory 810a stores spin interactions of numbers i=1 to N/2, and the spin interaction memory 810b stores spin interactions of numbers N/2+1 to N. The spin state update unit 820a updates spins of numbers i=1 to N/2, and the spin state update unit 820b updates spins of numbers N/2+1 to N.

Figure 15:
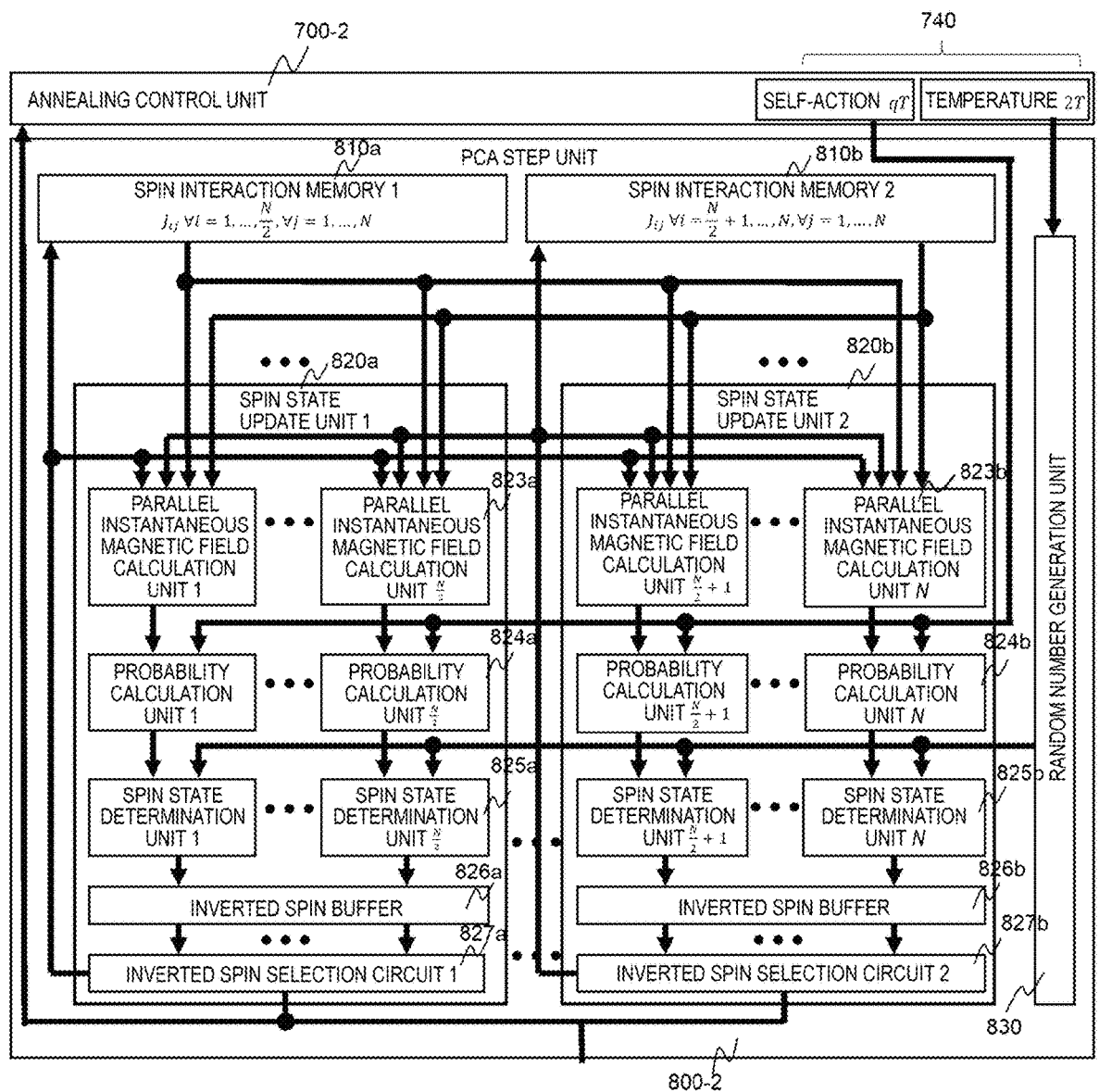
FIG. 15 is a block diagram illustrating details of the annealing control unit and the PCA step unit.

FIG. 15 is a block diagram illustrating details of an annealing control unit 700-2 and a PCA step unit 800-2. FIG. 15 is basically the same as FIG. 8A, but is divided into two blocks operable in parallel indicated by subscripts a and b.

Figure 16A:
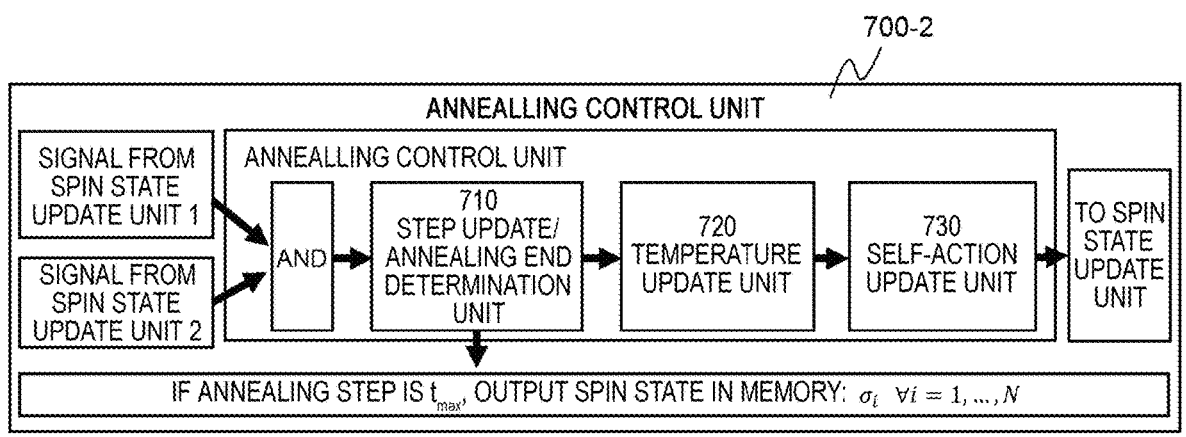
FIG. 16A is a block diagram illustrating functions of the annealing control unit.

FIG. 16A is a diagram illustrating the function of the annealing control unit 700-2. It is basically the same as FIG. 7A, but includes a function of adjusting two blocks that can be operated in parallel. That is, the logical AND of the step end signals from a pair of spin state update units 1 (820a) and 2 (820b) is taken, and after both signals are obtained, that is, after both annealing steps have been completed, it is configured to proceed to the next annealing step.

Figure 16B:
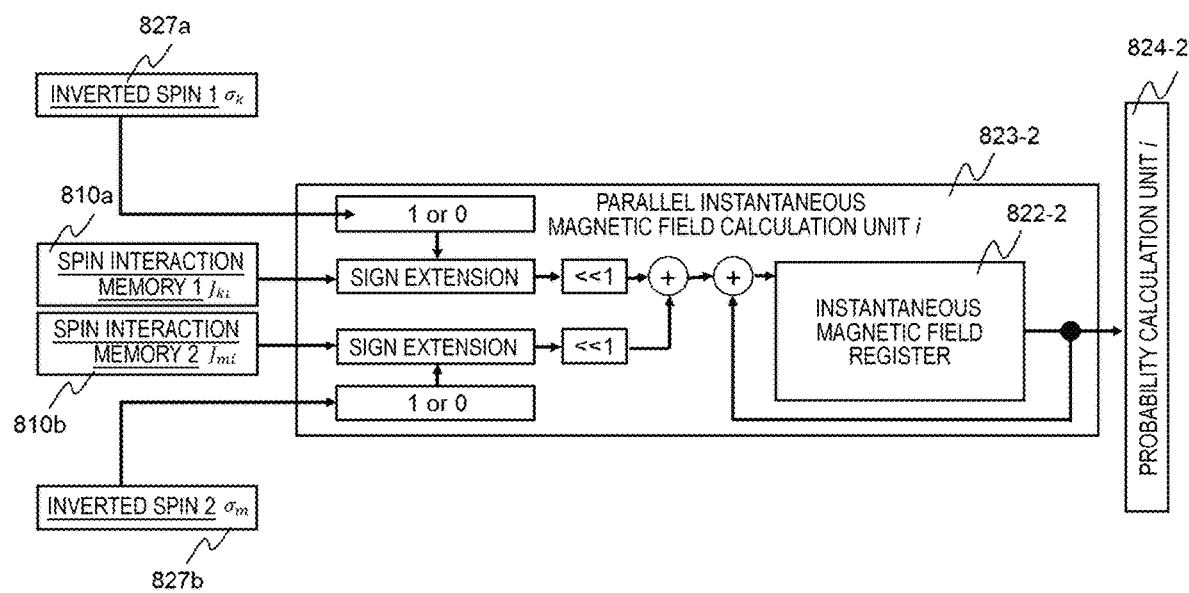
FIG. 16B is a block diagram illustrating an instantaneous magnetic field calculation unit.

FIG. 16B is a block diagram illustrating an instantaneous magnetic field calculation unit 823-2. Spin interaction calculations are performed in parallel. The instantaneous magnetic field calculation unit 823-2 reads in parallel values $j_{ki}$ and $j_{mi}$ of the interaction coefficients of the spin interaction memories 810a and 810b addressed by the inverted spin selection circuits 827a and 827b, and spin values $\sigma_k$ and $\sigma_m$ of the inverted spin selection circuits 827a and 827b as inputs. Sign values of spin values $\sigma_k$ and $\sigma_m$ having +1 or −1 are sign-extended. "<<1" means to shift a bit one place to the left, which is the same as multiplying by two. Thereby, $2\sigma_k j_{ik}$ and $2\sigma_m j_{im}$ are calculated and added. $2\sigma_k j_{ik}+2\sigma_m j_{im}$ is added to the current instantaneous magnetic field $Ih_i$ value of the instantaneous magnetic field register 822, and a new instantaneous magnetic field value is written to the instantaneous magnetic field register 822 as $Ih_i \leftarrow Ih_i+2\sigma_k j_{ik}+2\sigma_m j_{im}$. The value of the instantaneous magnetic field $Ih_i$ is input to a probability calculation unit 824-2. With such a configuration, the instantaneous magnetic field calculation unit 823-2 can obtain spin information updated in the two blocks.

Example 4

In order to construct an annealing machine capable of searching for a ground state of a large-scale Ising model including a large number of spins, it is necessary to mount unit elements on a semiconductor chip in a number corresponding to the number of spins. Such a semiconductor device has a large chip size and a high manufacturing cost. Therefore, when realizing such a semiconductor device, it is desirable to construct by connecting a plurality of semiconductor chips on which a certain number of unit elements are mounted. In Example 4, a plurality of the annealing machines described in Example 1 are connected. Here, the annealing machine is a semiconductor chip created by a semiconductor manufacturing technique and is referred to as an annealing chip.

Figure 17A:
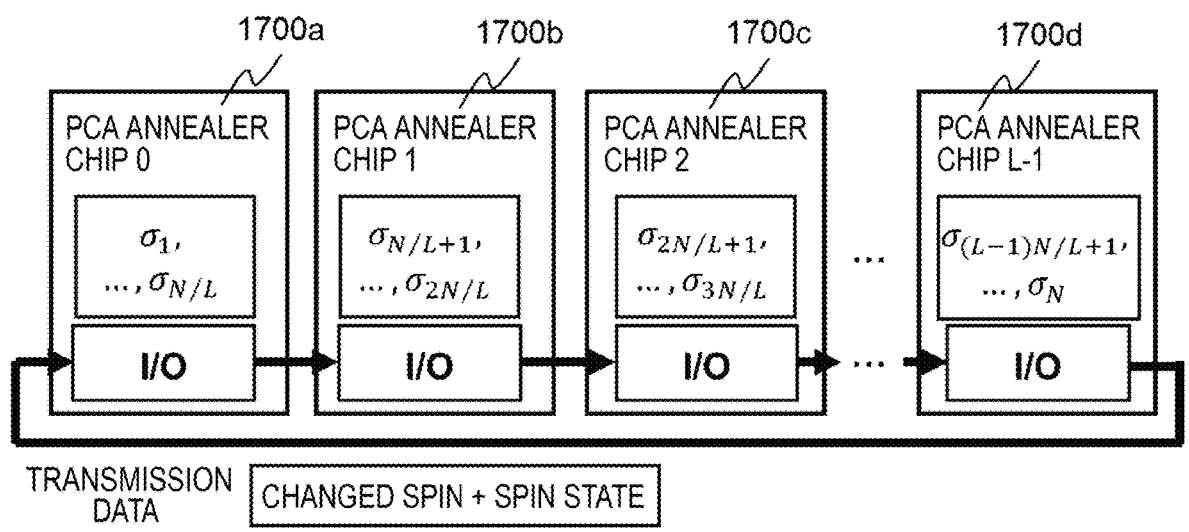
FIG. 17A is a conceptual diagram illustrating an outline of multi-annealer chips.

FIG. 17A is a conceptual diagram illustrating an outline of the multi-annealer chips of Example 4. An annealer chip 1700 is a semiconductor chip basically including the configuration of the annealing machine 620. Here, an example in which L annealer chips are connected is illustrated. Each annealer chip is responsible for processing by dividing N spins into L. For example, an annealer chip 1700a is responsible for spins between $\sigma_1$ and $\sigma N/L$, and an annealer chip 1700b is responsible for spins between $\sigma_{N/L+1}$ and $\sigma_{2N/L}$. Each of multi-annealer chips is configured to be able to circulate and transfer data.

FIG. 17B is a conceptual diagram illustrating a matrix of interaction coefficients stored in the spin interaction memory 810 of each annealer chip when L=4 as an example.

In the configuration of the multi-annealer chips, it is necessary that the chips share the spin state $\sigma_i$ and updated spin information. Therefore, these pieces of information are transmitted between the annealer chips 1700 as transmission data. The contents of the transmission data are the updated value of the spin $\sigma_1$ and the interaction coefficient $j_{ij}$.

FIG. 17C is a diagram illustrating the flow of processing in each annealer chip when L=4. In the first update probability calculation S503 and the spin update S504 in the annealing step of FIG. 5, the updated spin and the value thereof are calculated in each annealing chip (in the first stage, the instantaneous magnetic field is an initial value). In order to update the instantaneous magnetic field S502, the updated spin interaction coefficient and the value of the value must be notified to another annealing chip.

In FIG. 17C, in the step 1, each of the annealer chips 0 to 3 obtains information (the changed spins 0 to 3) on the spin updated in the own chip. In the subsequent steps 2 to 4, the changed spins 0 to 3 are sequentially transferred to the adjacent annealer chips. In the step 4, since information on all updated spins is distributed to each of the annealer chips, the instantaneous magnetic field update processing S502 can be performed.

Figure 18:
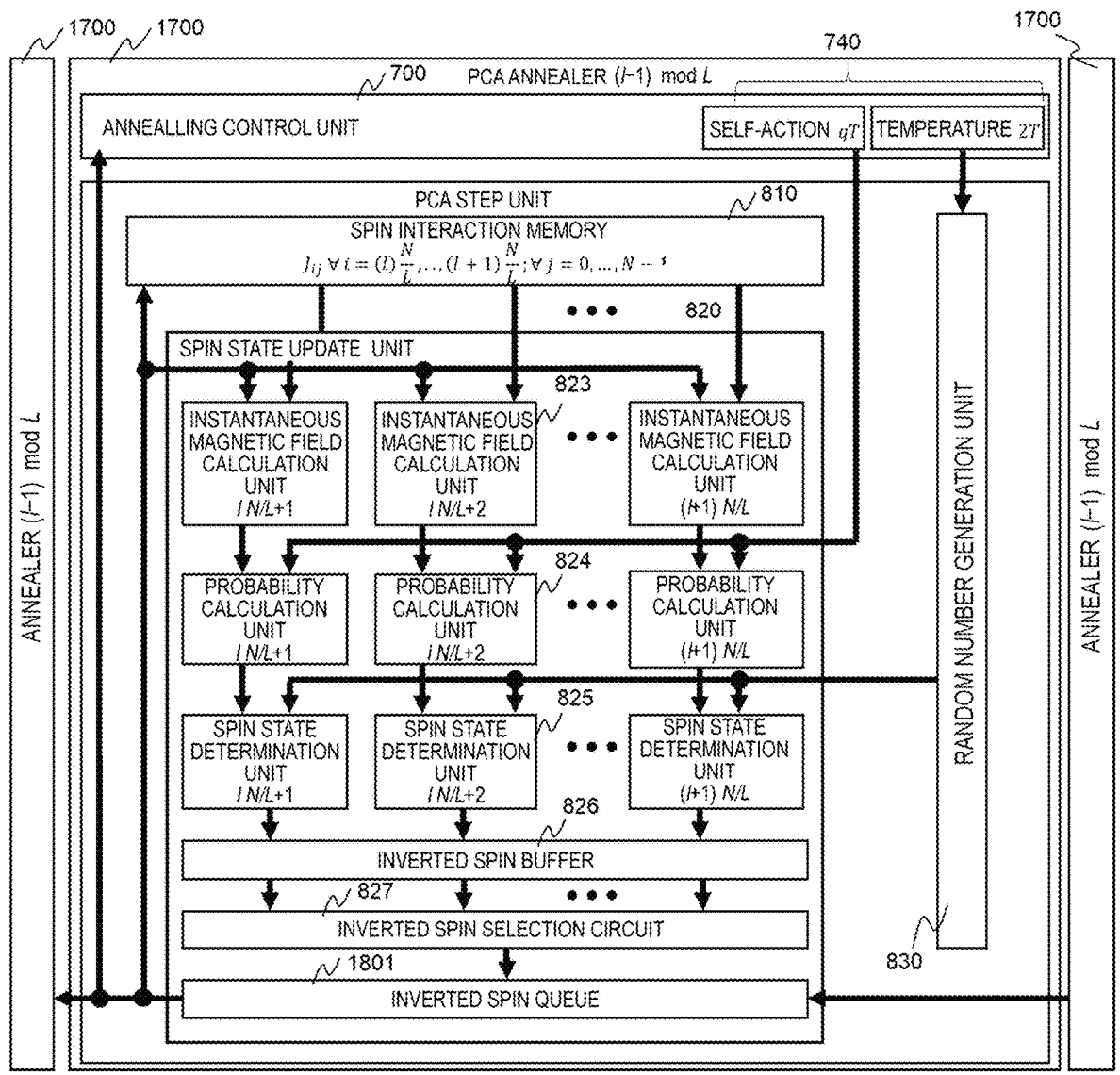
FIG. 18 is a block diagram illustrating details of an annealing control unit and a PCA step unit of the multi-annealer chips.

FIG. 18 is a block diagram illustrating details of the annealing control unit 700 and the PCA step unit 800 in a multi-annealer chip configuration. Although the configuration is substantially the same as that of FIG. 8A, the PCA step unit 800 includes an inverted spin queue 1801. In the step 1 of FIG. 17C, the inverted spin queue 1801 transfers the information of the changed spin of the own chip to the adjacent chip. In the step 2 and subsequent steps, information on the changed spins sent from the adjacent annealer chip is stored for each step and further transferred to the adjacent annealer chip. If there are N annealer chips, the update processing S502 of the instantaneous magnetic field can be performed after N steps.

Example 5

This example illustrates an example in which a macrospin is used instead of a spin. The macro-spin applies a majority value of the values of a plurality of spins instead of a value of individual spin.

FIG. 19A illustrates the concept of a macro-spin. N spins are divided into M groups. The value of the i-th spin is represented by $\sigma_i$. The majority of the values of the spins belonging to each group determine the macro-spin $\sigma'_m$ of the m-th group. The macro-spin $\sigma'_m$ is applied as the value of all spins belonging to the m-th group.

For example, it is assumed that the number of spins belonging to a certain group is 6. Assuming that the values of the six spins are 1,1, −1,1, −1, and 1, the macro-spin of this group is "1" because there are four "1" and two "−1". All the values of the spins in the group are treated as "1". By using the macro-spin, the amount of calculation can be reduced.

Figure 19B:
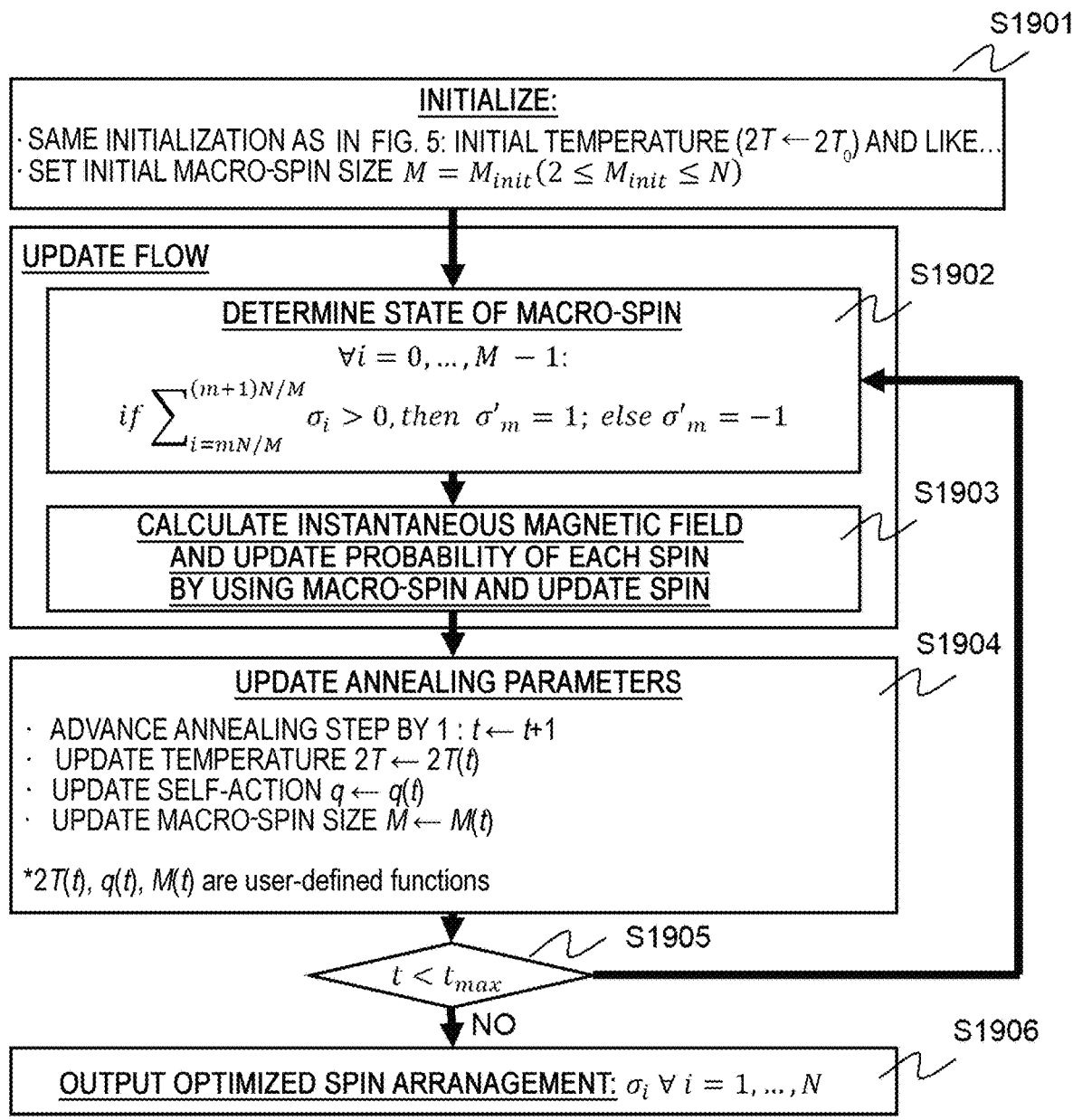
FIG. 19B is a flowchart illustrating processing performed by an annealing machine according to Example 4.

FIG. 19B is a flowchart illustrating processing performed by the annealing machine according to Example 5 using the macro-spin. It is assumed that the optimization problem has already been modeled in the form of a complete graph. Since the basic processing is the same as that of the example illustrated FIG. 5, the difference will be particularly described.

The initialization processing S1901 is the same as the initialization processing S501 in FIG. 5. However, in the initialization processing S1901, an initial macro-spin size $M=M_{init}$ ($2 \leq M_{init} \leq N$) is set.

In the macro-spin state determination processing S1902, the value of the macro-spin is determined by the majority determination described above. For example, if the sum of the values of the spins $\sigma_i$ in a group m is greater than 0, macro-spin $\sigma'_m=1$, otherwise $\sigma'_m=-1$.

In the spin update processing S1903, the instantaneous magnetic field Ih and the update probability x of each spin are calculated by using the macro spin, and the spin is updated. Except for using the macro-spin instead of the spin, the example may be the same as the example of FIG. 5.

In the processing S1904, the annealing parameters are updated. The details of the update may be the same as in the example of FIG. 5. The macro-spin size M is also updated. The macro-spin size M is gradually increased, for example, to approach N. At the end of the annealing step, it is desirable that M=N and that no macro-spin is used.

This is repeated until the annealing step t reaches t_max in the determination processing S1905. When the annealing step t reaches t_max, the spin arrangement $\sigma_i$ is read and output as a (pseudo) optimized spin arrangement (S1906).

The present invention is not limited to the embodiments described above and includes various modification examples. For example, a part of the configuration of one example can be replaced with the configuration of another example, and the configuration of another example can be added to the configuration of one example. Further, for a part of the configuration of each example, it is possible to add, delete, or replace the configuration of another example.

What is claimed is:

1. An information processing apparatus comprising an annealing control unit, a spin interaction memory, a random number generation unit, and a spin state update unit and obtaining a solution by using an Ising model, wherein
   the annealing control unit controls an annealing step and controls a temperature parameter and a self-action parameter,
   the spin interaction memory stores an interaction coefficient of a spin,
   the random number generation unit generates a predetermined random number, and
   the spin state update unit includes
   a spin buffer that stores values of a plurality of spins,
   an instantaneous magnetic field calculation unit that calculates instantaneous magnetic fields of the plurality of spins;
   a probability calculation unit that calculates update probabilities of the plurality of spins, and a spin state determination unit that updates the values of the plurality of spins based on the update probabilities and the predetermined random number.

2. The information processing apparatus according to claim 1, wherein
the spin state update unit includes
a plurality of instantaneous magnetic field calculation units that calculate the instantaneous magnetic fields of the plurality of spins in parallel,
a plurality of probability calculation units that calculate the update probabilities of the plurality of spins in parallel, and
a plurality of spin state determination units that update the values of the plurality of spins in parallel based on the update probabilities and the predetermined random number.

3. The information processing apparatus according to claim 2, wherein
before the annealing step is started, the instantaneous magnetic fields are initialized based on the values of the plurality of spins, an external magnetic field coefficient, and the interaction coefficient, and
the instantaneous magnetic field calculation unit updates the values of the instantaneous magnetic fields as the annealing step proceeds.

4. The information processing apparatus according to claim 3, wherein
the instantaneous magnetic field calculation unit includes an instantaneous magnetic field register that stores the values of the instantaneous magnetic fields, and
when updating the values of the instantaneous magnetic fields as the annealing step proceeds, for spins changed in an immediately preceding annealing step, the instantaneous magnetic field calculation unit calculates updated instantaneous magnetic fields of the spins by using the values of the spins changed in an immediately preceding annealing step, an interaction coefficient for the spins changed in an immediately preceding annealing step, and the values of the instantaneous magnetic fields before an update is stored in the instantaneous magnetic field register.

5. The information processing apparatus according to claim 4, further comprising:
an inverted spin buffer; and
an inverted spin selection circuit, wherein
as the annealing step proceeds, when updating the values of the spins, the spin state determination unit stores the values of updated spins and inversion flags for identifying the updated spins in the inversion spin buffer,
the inversion spin selection circuit sends the values of the updated spins to the instantaneous magnetic field calculation unit and sends information for identifying the updated spins based on the inversion flags to the spin interaction memory, and
the spin interaction memory sends an interaction coefficient related to the spins to the instantaneous magnetic field calculation unit based on the information for identifying the updated spins.

6. The information processing apparatus according to claim 2, wherein
the probability calculation unit compares a predetermined function and the predetermined random number and determines where to update the spins by inverting the plurality of spins based on the comparison result or to maintain states of the plurality of spins.

7. The information processing apparatus according to claim 6, wherein the predetermined function is a function obtained by linearly approximating a sigmoid function.

8. The information processing apparatus according to claim 6, wherein
the annealing control unit controls a value of 2T as the temperature parameter and controls a value of qT as the self-action parameter,
the random number generation unit generates the predetermined random number having a value between −2T and 2T, and
the predetermined function has a spin value, an instantaneous magnetic field, and qT as arguments.

9. The information processing apparatus according to claim 1, wherein
the parameter of the self-action takes a maximum value in a final annealing step.

10. The information processing apparatus according to claim 5, wherein
in a predetermined annealing step, the inverted spin selection circuit sends the values of all the updated spins to the instantaneous magnetic field calculation unit and sends a step end signal to the annealing control unit when all of the information for identifying all the updated spins based on the inversion flags is sent to the spin interaction memory, and
upon receiving the step end signal, the annealing control unit advances the annealing step by 1 and updates the temperature parameter and the self-action parameter.

11. The information processing apparatus according to claim 10, further comprising:
a first spin interaction memory and a second spin interaction memory, as the spin interaction memory; and
a first spin state update unit and a second spin state update unit, as the spin state update unit, wherein
the first spin state update unit includes a first instantaneous magnetic field calculation unit, a first inverted spin buffer, and a first inverted spin selection circuit,
the second spin state update unit includes a second instantaneous magnetic field calculation unit, a second inverted spin buffer, and a second inverted spin selection circuit,
the first instantaneous magnetic field calculation unit receives interaction coefficients from the first spin interaction memory and the second spin interaction memory and receives values of spins from the first inverted spin buffer and the second inverted spin buffer,
the second instantaneous magnetic field calculation unit receives the interaction coefficients from the first spin interaction memory and the second spin interaction memory and receives the values of spins from the first inverted spin buffer and the second inverted spin buffer, and
upon receiving both a first step end signal from the first inverted spin selection circuit and a second step end signal from the second inverted spin selection circuit, the annealing control unit advances an annealing step by 1 and updates the temperature parameter and the self-action parameter.

12. An information processing apparatus comprising:
a plurality of semiconductor chips that are mounted with the information processing apparatus according to claim 1, wherein
the plurality of semiconductor chips share the interaction coefficient in the spin interaction memory and the values of the plurality of spins.

13. The information processing apparatus according to claim 1, wherein the plurality of spins are grouped and the spins in one group are unified to a value determined by a majority of the values of the spins of the group.

14. An information processing method for obtaining a solution by using an Ising model by an information processing apparatus including an annealing control unit, a spin interaction memory, a random number generation unit, and a spin state update unit, wherein the annealing control unit controls an annealing step and updates a temperature parameter and a self-action parameter, the spin interaction memory stores a spin interaction coefficient, the random number generation unit generates a predetermined random number, for each annealing step, the spin state update unit calculates instantaneous magnetic fields of a plurality of spins in parallel by using the spin interaction coefficient, calculates update probabilities of the plurality of spins in parallel by using the instantaneous magnetic fields, and updates values of the plurality of spins in parallel by using the update probabilities and the predetermined random number, and the spin interaction coefficient used for calculating the instantaneous magnetic fields is an interaction coefficient related to the plurality of spins updated in an immediately preceding annealing step.

15. The information processing method according to claim 14, wherein the temperature parameter is 2T, the self-action parameter is qT, the predetermined random number takes a value between −2T and 2T, and each update probability of the update probabilities is a value obtained by adding the qT to a value of a corresponding instantaneous magnetic field of the instantaneous magnetic fields or a value obtained by inverting a sign of the corresponding instantaneous magnetic field.

* * * * *